United States Patent [19]

Cowan

[11] Patent Number: 5,409,064
[45] Date of Patent: Apr. 25, 1995

[54] OPTIMIZING BLAST FURNACE SLAG CEMENTS

[75] Inventor: Kenneth M. Cowan, Sugar Land, Tex.

[73] Assignee: Shell Oil Company, Houston, Tex.

[21] Appl. No.: 176,143

[22] Filed: Dec. 30, 1993

[51] Int. Cl.⁶ .............................................. E21B 33/13
[52] U.S. Cl. ................................. 166/293; 166/292; 106/790
[58] Field of Search ................ 166/292, 293; 106/789, 106/790

[56] References Cited

U.S. PATENT DOCUMENTS

| | | | |
|---|---|---|---|
| 2,822,873 | 2/1958 | Harmsen et al. | |
| 3,168,139 | 2/1965 | Kennedy et al. | |
| 3,557,876 | 1/1971 | Tragesser | 166/292 |
| 4,548,720 | 10/1985 | Gilligan, III | 166/902 |
| 4,897,119 | 1/1990 | Clarke | 106/790 |
| 5,058,679 | 10/1991 | Hale et al. | 166/293 |
| 5,082,501 | 1/1992 | Kurz | 106/790 X |
| 5,284,513 | 2/1994 | Cowan et al. | 106/790 |
| 5,314,022 | 5/1994 | Cowan et al. | 166/293 |

OTHER PUBLICATIONS

K. M. Cowan and T. R. Smith, "Application of Drilling Fluids to Cement," Paper No. 93-601, presented at the CADE/CAODC Spring Drilling Conference, Apr. 14-16, 1993, Calgary, Alberta Canada, pp. 1/11-11/11.

K. Javanmardi, K. D. Flodberg, and J. J. Nahm, "Mud to Cement Technology Proven in Offshore Drilling Project," *Oil and Gas Journal*, vol. 91, No. 7, OGJ Special, Feb. 15, 1993, pp. 49-57.

K. M. Cowan, "Solidify Mud to Save Cementing Time and Reduce Waste," *World Oil*, Oct. 1993, pp. 43-50.

K. M. Cowan, A. H. Hale, and J. J. Nahm, "Conversion of Drilling Fluids to Cements with Blast Furnace Slag—Performance Properties and Applications for Well Cementing," SPE 24575, pp. 1-12.

*Primary Examiner*—George A. Suchfield

[57] ABSTRACT

A method and composition for cementing a well by combining water, blast furnace slag and sodium pyrophosphate to form a cement slurry, displacing the cement slurry into a well and allowing the cement slurry to set.

60 Claims, 12 Drawing Sheets

5,409,064

OPTIMIZING BLAST FURNACE SLAG CEMENTS

BACKGROUND OF THE INVENTION

1. Field of the Invention

The present invention pertains to the optimization of methods and formulations for zonal isolation for vertical, deviated, and horizontal oil and gas wells using blast furnace slag cement.

2. Description of Prior Art

The general procedure of drilling an oil or gas well includes drilling a borehole using a drilling fluid. Subsequent to drilling the borehole, casing is run into the well and a cement slurry is placed in the annulus between the outside of the casing and the borehole wall. Typically, the cement slurry is placed in the annulus using a successive fluid displacement technique. In this technique, the cement is first pumped into the casing. Another fluid, often drilling fluid or water, is pumped behind the cement to space it out the bottom of the casing and up into the annulus between the casing and the borehole wall. The cement slurry is usually raised to a point above the uppermost section of the formations to be isolated and may be raised into the annulus between the casing string being cemented and a previously cemented casing.

Once placed, the purpose of the cement slurry is to harden in the annulus and provide an effective seal between the casing and the borehole. The hardened cement sheath prevents or inhibits communication of fluids between the various formations penetrated by the wellbore. Conditions providing zonal isolation of the cement is in contact with the casing and provides mechanical support and resistance to axial movement through the shear bond developed between the interfaces of cement and pipe and cement and formation.

Applicant's U.S. Pat. No. 5,058,679 dealt with an improvement in the bonding of the cement to the casing and borehole surfaces. This improvement was realized through the use of a cement comprising drilling fluid and blast furnace slag. This has proven to be an effective cementing technique and is rapidly gaining commercial acceptance. However, the formulation and design methodology for blast furnace slag cement and drilling fluid-blast furnace slag cements are presently not well defined. Requirements for slurry and hardened material properties are generally the same as Portland cement for a specific set of well conditions. The most effective way to formulate blast furnace slag cements or drilling fluid-blast furnace slag slurries and to obtain the desired properties is not completely understood by the art. Accordingly, the present invention is directed toward overcoming these and other problems in the art.

SUMMARY OF THE INVENTION

It is a primary purpose of the present invention to provide compositions and methods for optimizing the use of blast furnace slag cement and drilling fluid-blast furnace slag cements for cementing oil and gas wells.

A preferred embodiment of the invention comprises a composition and method for cementing a well by combining constituents comprising water and blast furnace slag having a particle size within the range of 2,000 $cm^2/g$ to 15,000 $cm^2/g$, and an activator comprising sodium pyrophosphate to form a cement slurry; displacing the cement slurry into the well; and allowing the cement slurry to set.

Other purposes, distinctions over the art, advantages and features of the invention will be apparent to one skilled in the art upon review of the following.

DETAILED DESCRIPTION OF PREFERRED EMBODIMENTS

Figure 1:
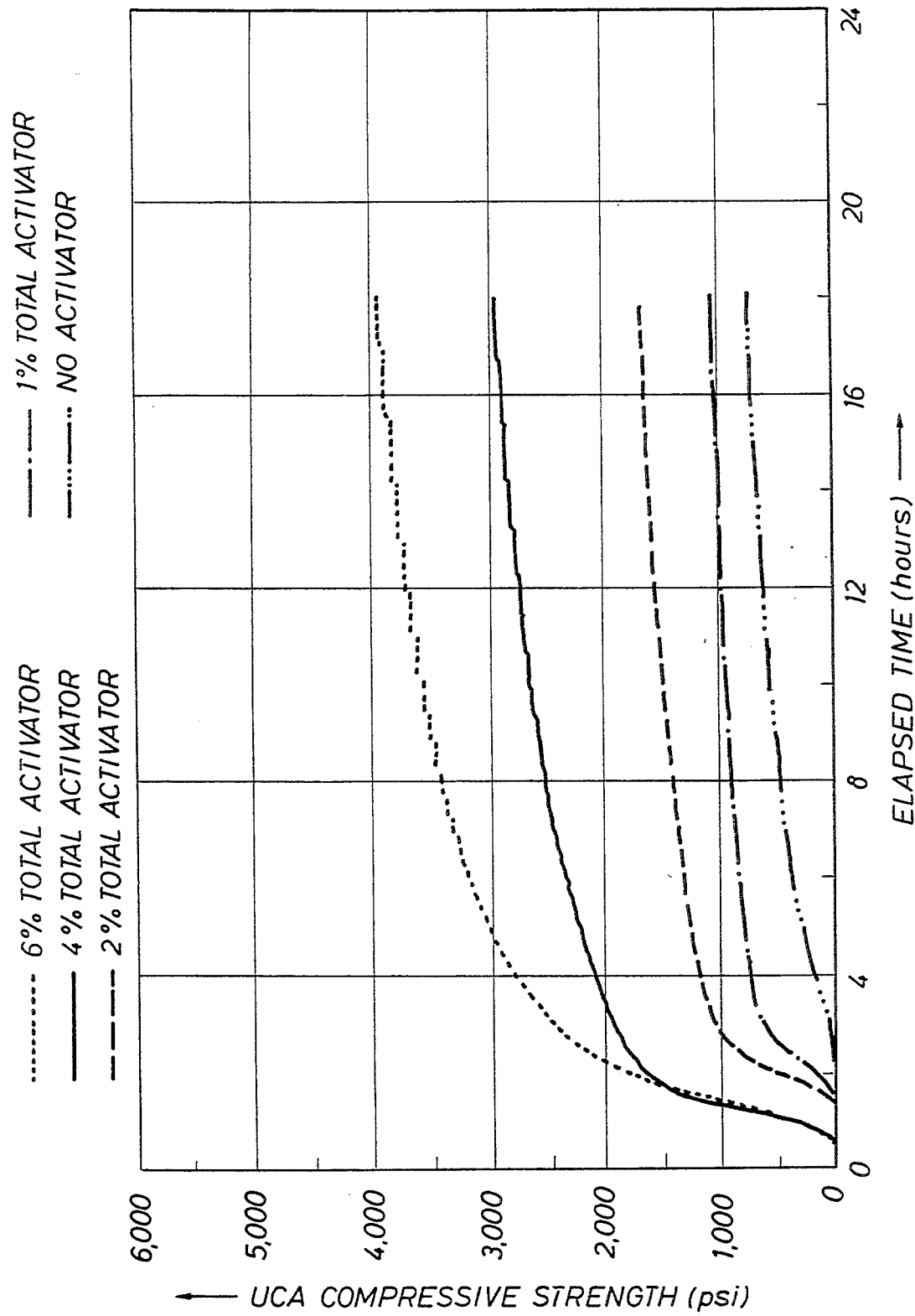
FIG. 1 shows the total impact of activator on set time of slag formulations, rate of early compressive strength development immediately after set time, and final or total compressive strength of the formulations.

The following preferred embodiments of the invention, together with the following Examples, explain the principles of the invention.

The present invention provides unique methods and formulations which are devised to provide optimum zonal isolation for vertical, deviated, and horizontal wells. The invention centers around the optimized solidification of oil or water-based muds in combination with blast furnace slag to compressive strengths well in excess of that required for casing support, zonal isolation, and borehole stability.

Water-based drilling fluids typically include water and several other additives such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid. The term "water-based" means that water is the continuous phase of the drilling fluid. The water for water-based drilling fluids can be fresh water, brackish water, brine, seawater or other water containing fluids.

Oil-based drilling fluids typically include oil, water, organophilic clay, primary and secondary emulsifiers and wetting agents. Oil may be diesel, mineral oil, vegetable oil, fish oil, synthetic oils (polyalphaolefins), and esters thereof.

Many different additives and dispersants have been utilized that provide the desired properties in drilling fluids. Exemplary of those additives are barium sulfate (barite), bentonite, low and medium yield clays, salt water clay, iron oxide, calcium carbonate, starch, carboxymethylcellulose, acrylonitrile, natural gum, molecularly dehydrated phosphate, tannin compounds, quebracho, mined lignins, lignosulfonate, mica, sugar cane fibers, and granular materials. Bentonite is an especially common additive which gives the drilling fluid a thixotropic or a gel structure. Bentonite is also a common additive which is added to the drilling fluids to control fluid loss; phosphate and lignosulfonate additives which deflocculate colloidal solids and thin the drilling fluids are also common.

Solidification of drilling fluid is accomplished by the addition of blast furnace slag along with additives for the control of setting time and rheological properties of the slag-treated fluid. The term "blast furnace slag" refers to the refuse from the melting of metals or reduction of ores in a furnace. Most notably, blast furnace slag is a by-product of the manufacture of steel in a blast furnace. In steel making, the blast furnace slag is discharged from the service as a molten stream at a temperature typically between 1400° C. and 1600° C. Rapid quenching of the slag results in its conversion into a material which has hydraulic properties. The rapid quenching of the slag converts it into a glassy state and it is generally recognized that the hydraulic quality of the slag depends upon the effectiveness of the process used to rapidly cool the slag and freeze it into the granulated, glassy state. The preferred blast furnace slag of the invention is a high glass content slag produced by quickly quenching the molten slag through intimate contact with large volumes of cool water. Slags produced by air quenching may be used in the invention provided they are determined to have cementitious properties. However, these are less desirable. The finest of the slag particles should be between about 2,000 $cm^2/g$ and 15,000 $cm^2/g$, more preferably between 3,000 $cm^2/g$ and 9,000 $cm^2/g$, most preferably between 4,000 $cm^2/g$ and 6,500 $cm^2/g$. A commercially available blast furnace slag which fulfills the requirements of the invention is marketed under the trade name "NEW-CEM" by the Blue Circle Atlantic Company. This slag is obtained from the Bethlehem Steel Corporation blast furnace at Sparrow's Point, Md.

Rheological properties of the slag treated drilling fluid can be modified through the use of many conventional chemical dispersants for water-based or oil-based drilling fluids. Examples of such compounds include lignosulfonates, naphthalene sulfonates, phenol sulfonates, phosphates, phosphonates, sulfonated styrene maleic anhydride, sulfonated toluene maleic anhydride, sulfonated styrene maleimide, polyacrylates, polymethacrylates, blends of polyacrylates and polymethacrylates, acrylamide-acrylic acid copolymers, or blends of any of these classes of materials provided they are chemically compatible to allow their mixing while retaining the ability to disperse particles in the drilling fluid.

Selecting General Types of Activators

Blast furnace slag is a latent hydraulic material. It must be activated to set in order to form a useful cement. Activation can be either thermal energy (heat) or chemical energy (chemical activation). If there is sufficient thermal energy (high temperature) no chemical activators may be required. However, at low temperatures, chemical activators are almost certainly required to optimize set time and compressive strength. In most cases, it is common and often desirable to use a combination of thermal and chemical activation to optimize the properties of the slag-containing cementitious mixture.

Alkali or bases, compounds which increase the pH of the liquid portion of a blast furnace slag/drilling fluid mixture or blast furnace slag cement slurry, are used as chemical activators. However, since thermal energy contributes to the total activation energy, the type of chemical activators and their amount can vary. Strong alkali are required at low temperatures where weak alkali can be used when the temperature is higher.

Components of the activator can be a mixture of alkali or alkali in combination of chelating, complexing or sequestering agents. It is desirable in cases where temperatures are low to use strong alkali-containing hydroxyl groups such as alkali earth metal hydroxides. These oxides include lithium hydroxide, sodium hydroxide, potassium hydroxide, calcium hydroxide, magnesium hydroxide, barium hydroxide, as examples. The more soluble alkali earth metal hydroxides are, in general, better activators at low temperature. It is believed that their higher solubility in water at low temperatures is the primary reason they are better low temperature activators. The most commonly applied alkali earth metal hydroxides at low temperature are sodium hydroxide, potassium hydroxide, lithium hydroxide and barium hydroxide. These alkali earth metal hydroxides have a greater effect on the set time of the slag-containing cementitious mixture. Concentrations range between 0.01 to 20%wt of slag, more preferably 0.1 to 16%wt of slag, even more preferably between 0.25 to 14%wt of slag, and most preferably 0.5 to 10%wt of slag.

It is also common to use a weaker alkali as part of the activator component, in particular, weaker alkali containing a carbonate or phosphate group. The carbonate ion in particular has a beneficial effect on the compressive strength development and overall compressive strength of the slag-containing mixture. Few anion species can replace carbonate as a part of the activator which significantly affects compressive strength. Alkali earth metal carbonates which are most commonly applied as a component in the total activator include lithium carbonate, sodium carbonate, potassium carbonate, calcium carbonate, magnesium carbonate, barium carbonate, sodium potassium carbonate, etc., as examples. Again, as with the alkali-containing hydroxyl groups, greater solubility provides greater effects. The most commonly applied carbonate-containing compounds used include sodium carbonate, potassium carbonate and sodium potassium carbonate. Typical concentrations are 0.25 to 25%wt of slag, more preferably 0.5 to 20%wt of slag, even more preferably 1.0 to 15%wt of slag, and most preferably 2 to 12%wt of slag.

The phosphate anion is an anionic chemical species which can contribute to compressive strength like the carbonate ion. However, the phosphate ion-containing compounds tend to retard the slag hydration much more than the carbonate. Basic phosphates such as sodium pyrophosphate, sodium hexametaphosphate, tetrasodium polyphosphate, tetrasodium polyphosphate, etc., have application in formulations to control set time and contribute to compressive strength development. Of these, sodium pyrophosphate has shown the greatest potential. Typical concentrations are 0.001 to 15%wt of slag, more preferably 0.01 to 10%wt of slag, even more preferably 0.1 to 8%wt of slag, and most preferably 0.25 to 6%wt of slag.

The citrate ion also can contribute to compressive strength. Alkali earth metal salts of citric acid such as sodium citrate, calcium citrate, potassium citrate, etc., are examples. Of these, sodium or potassium citrate are most preferred.

Compounds containing phosphate and citrate have an advantage over carbonate or hydroxyl-containing compounds in rheological properties of the slurry. Phosphate or citrate-containing compounds are effective dispersants for slag and clays in drilling fluid formulations. Thus, less dilution may be required for drilling fluid-blast furnace slurries or better rheological properties may be obtained.

Other components of the activator include a chelating, complexing or sequestering agent. These types of compounds include the phosphate and citrate ion-containing compound previously described. Other compounds such as ethylenediamine tetraacetic acid and its salts, phosphonic acids and their salts, glutamic acid and its salts, gluconic acid and its salts, some amines, phosphinic acids and their salts, aminophosphinic acids and their salts, lactic acid and its salts, aspartic acid and its salts, tartaric acid and its salts, etc. It is most desirable to use salts since the acid forms counteract the alkali added for chemical activation. Highly soluble salts are preferred. Sodium and potassium salts are usually quite soluble. Many other types of chelating, complexing or sequestering agents are known and many are listed in the book *Organic Sequestering Agents* by Stanley Chaberek and Arthur E. Martell, published by John Wiley & Sons, New York. Concentrations typically range between 0.001 to 10%wt of slag, more preferably 0.01 to 8%wt of slag and most preferably 0.05 to 5%wt of slag.

Chemical compounds which are chelating, complexing, or sequestering agents for alkali earth metals and transition metals through iron in the Periodic Table of Elements have been found most suitable as components in the chemical activator mixture. Concentrations typically range between 0.001 to 10%wt of slag, more preferably 0.01 to 8%wt of slag and most preferably 0.05 to 5%wt of slag. Chelating, complexing or sequestering compounds with log (base 10) values for the equilibrium stability constants for complexed calcium between 2 and 5 have been most effective in improving strength and dispersing the slag with lowest effect on set time. A broad range for these log values is 0.5 to 11. The lower values tend to be stronger retarders while the higher values (above about 6) have less retarding effect but do not show an improvement in compressive strength development. In general, small amounts of these materials are used. Concentrations typically range from 0.001 to 8%wt of slag, preferably 0.01 to 6%wt of slag, and most preferably 0.05 to 5%wt of slag.

Selecting Total Activator Concentration

There is an optimum amount of activator which provides the maximum compressive strength for a given concentration of slag. The optimum total activator concentration is based upon the weight of slag used in the formulation. Therefore, the optimum weight ratio of total activator to slag is selected. This weight ratio varies with temperature because thermal energy (heat or temperature which is a measure of heat) is an activator for slag. The optimum weight ratio of total activator to slag decreases with temperature. For example, the optimum ratio is about 6 percent or 0.06 percent (activator weight/slag weight) at 125° F. The optimum may be about 8 percent (0.08) at 100° F., 12 percent (0.12) at 80° F., 2.5 percent (0.025) at 175° F. These optimum ratios also may vary with the compounds used as the activators. The ratios cited above are exemplary of mixtures of sodium hydroxide and sodium carbonate. Ranges for total activator concentrations are: 0.01 to 20%wt of slag, preferably 0.1 to 18%wt of slag, even more preferably 0.25 to 14%wt of slag, and most preferably 0.5 to 10%wt of slag.

Selecting the Ratio of Components in the Total Activator

Within the total activator concentration, there is a ratio of the individual components which provide optimum set time or optimum compressive strength or optimum early compressive strength development rate or optimum rheological properties for the cementing operation. There is also a combination of activators which will produce optimum properties for all these variables for a specific cementing operation.

The total activator concentration may be made up of different concentrations of different chemical components.

Selecting the Retarder

Once the total amount of activator and ratio of activator components has been selected which will optimize compressive strength and compressive strength development, a retarder is usually required to provide adequate fluidity time (sufficiently long set time) in order to place the cement in the well. Retarders are often added in a concentration of 0.001% to 12% by weight of slag, preferably 0.01 to 8%, and more preferably 0.05% to 5%wt of slag.

Retarders are of two types: complexing agents and salts of transition metals with atomic numbers above iron or nickel in the periodic chart. In particular, copper, zinc and aluminum salts can be effective retarders for slag hydration.

Complexing agents such as lignosulfonates and sulfonated lignins, and sulfonated Kraft lignins, lignin amines, etc., can be effective retarders. These are common retarders for Portland cements.

The most desirable retarders are low molecular weight complexing agents because they also contribute to improved compressive strength and early compressive strength development rate. Sodium glucoheptonate, sodium gluconate, sodium citrate, etc. can improve strength in combination with the activators in the formulation.

There is a ratio of activator to retarder which provides the greatest early compressive strength development and final strength for a given slag concentration. This ratio depends upon the strength of the retarders and activators used. In general, a combination of activators and retarders which will produce a set time less than about 10 hours, more preferably less than about 8 hours, and most preferably between 3 and 6 hours at the static temperature of the well will provide a high rate of early compressive strength development after setting and high final strength for the selected slag concentration.

Dispersion

Given two formulations with optimized ratios of slag and activators, activator components and activator-retarder ratio, the formulation which is more dispersed will generally have better compressive strength development after setting. Many of the complexing, sequestering or chelating agents mentioned earlier in this text are good dispersants for slag and drilling fluids containing clays.

Control of Sulfide Odors

Blast furnace slags contain some sulfur as residue from the iron or steel making process. This sulfur may be in forms which can produce sulfide species. Hydrogen sulfide may form although this is not expected at the alkaline pH of most activated slag cements.

However, sulfide scavenging compounds may be included as part of the activator or retarder on the slag-containing cementitious material. Additives such as zinc oxide, zinc carbonate are known scavengers for sulfide. Inclusion of one or more of these scavengers may prevent formation of hydrogen sulfide if a set slag-containing cement is drilled out or otherwise comes into contact with a low pH fluid which would favor formation of hydrogen sulfide.

EXAMPLES

The data presented in FIG. 1 is based on the following: Test Temperature: 125° F. (52° C.); Base Formulation: "NEWCEM" ® blast furnace slag+50% distilled water (by wt of slag)—(a) total activator concentration is percent by weight of slag; (b) the weight ratio of sodium hydroxide to sodium carbonate is 1:3 for all total activator concentrations; hence, 1% total activator=0.25% sodium hydroxide+0.75% sodium carbonate (by wt of slag); 2% total activator=0.5% sodium hydroxide+1.5% sodium carbonate (by wt of slag); 4% total activator=1% sodium hydroxide+3% sodium carbonate (by wt of slag).

FIG. 1 shows the impact of total activator on the:
a) set time of slag formulations,
b) rate of early compressive strength development immediately after set time, and
c) final or total compressive strength of the formulations.

A decrease in set time is seen along the X-axis as the lines showing compressive strength begin to move upward off of the 0 compressive strength line which is represented as the horizontal line of the X-axis. No activator produced a set time of about 2.5 hours. Increasing the activator concentration to 4% or 6% by weight of slag reduced the set time to less than 1 hour.

The rate of early compressive strength development is directly impacted by the activator concentration. The slope of the line from the set time until the strength reaches a plateau, wherein the rate of strength change with time has decreased to a near steady-state rate, is affected by the activator concentration. The slope is gradual without activator and becomes near vertical at 4% to 6% total activator at this temperature. It is desirable to have rapid early compressive strength development in many cementing operations. Slopes as compared in Table 1 labeled Example A-2.

The final compressive strength of each formulation increases with the total activator concentration. It is important to remember that the only thing changed is the total activator concentration. The amount of slag in each formulation is constant.

Also, there is an upper limit to the total activator concentration. This limit is the dilution effect limit and solubility limit of the activators.

Base Formulation: "NEWCEM" Blast Furnace Slag+50% Distilled Water (by weight of slag) Test temperature: 125° F. (52° C.)

a) Total Activator concentration is percent by weight of Slag.
b) The weight ratio of sodium hydroxide to sodium carbonate is 1:3 for all total activator concentrations, hence:
  1% total activator=0.25% sodium hydroxide+0.75% sodium carbonate (by weight of slag)
  2% total activator=0.5% sodium hydroxide+1.5% sodium carbonate (by weight of slag)
  4% total activator=1% sodium hydroxide+3% sodium carbonate (by weight of slag).

TABLE 1

| | | | Set Time and Compressive Strength Data | | | | |
|---|---|---|---|---|---|---|---|
| Additives and Concentration | Total Activator % bwos | Test Duration Hours | Set Time Hours | Equation for Line Between 50 psi and 500 psi | | Compressive Strength 14 hrs after Set Time | Final Strength psi |
| | | | | Slope | Intercept | | |
| None | 0 | 18 | 2.72 | 78.44 | −128.72 | 723 | 740 |
| None | 1 | 18 | 1.68 | 507.51 | −844.57 | 1039 | 1068 |
| None | 2 | 18 | 1.4 | 741.96 | −1046.07 | 1611 | 1677 |
| None | 4 | 18 | 0.6 | 1024.55 | −647.00 | 2836 | 2966 |
| None | 6 | 18 | 0.5 | 794.33 | −417.14 | 3824 | 3924 |

Base Formulation: "NEWCEM" Blast Furnace Slag + 50% Distilled Water (by wt of slag)
Test Temperature: 125° F. (52° C.)

Figure 2:
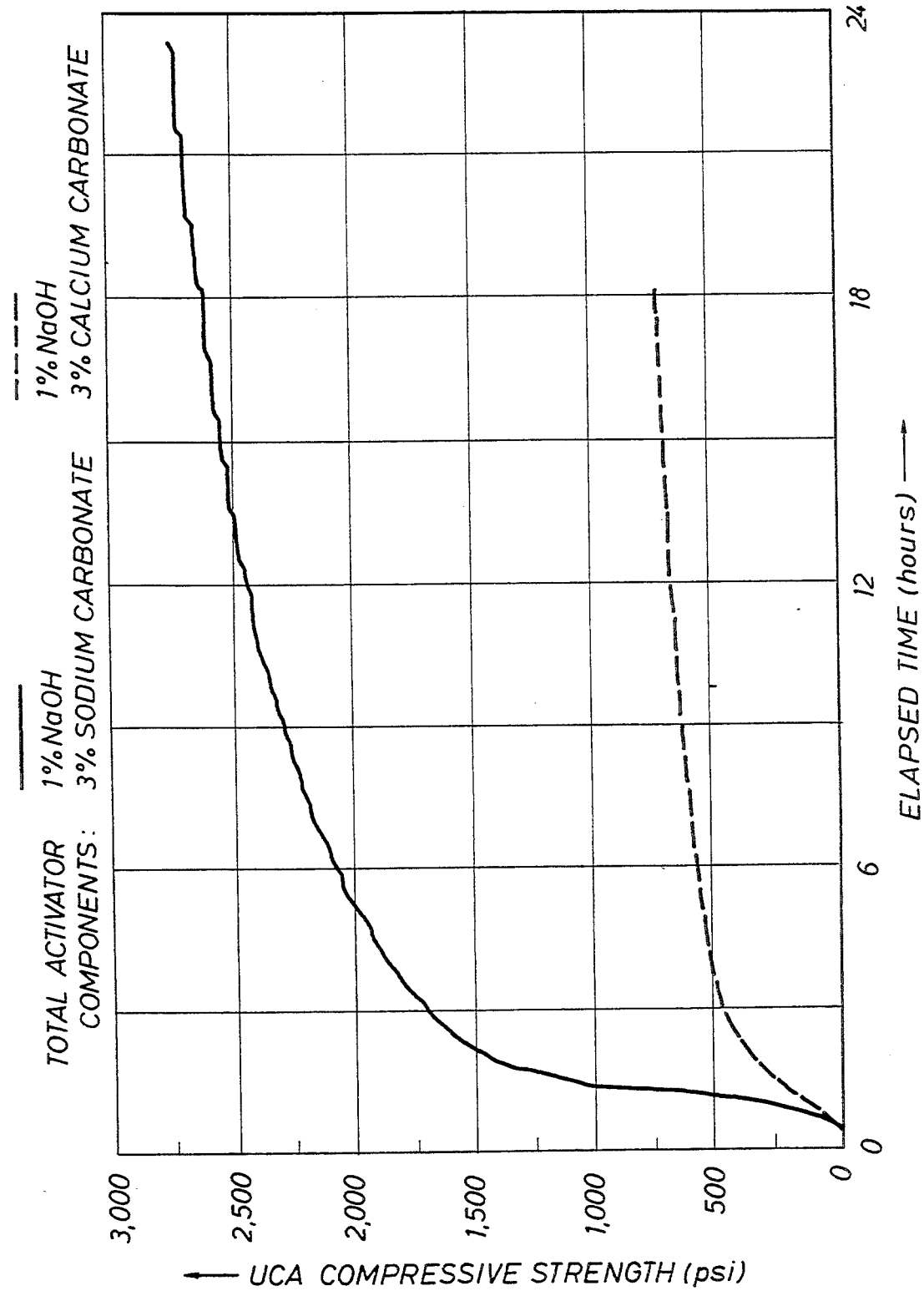
FIG. 2 shows sodium carbonate as the preferred carbonate when the basic formulation is blast furnace slag plus 50% distilled water by weight of slag.

FIG. 2 shows sodium carbonate as the preferred carbonate. The basic formulation is: "NEWCEM" blast furnace slag+50% distilled water (by weight of slag)+4% total activator (by weight of slag). Test temperature: 125° F. (52° C.).

Figure 5:
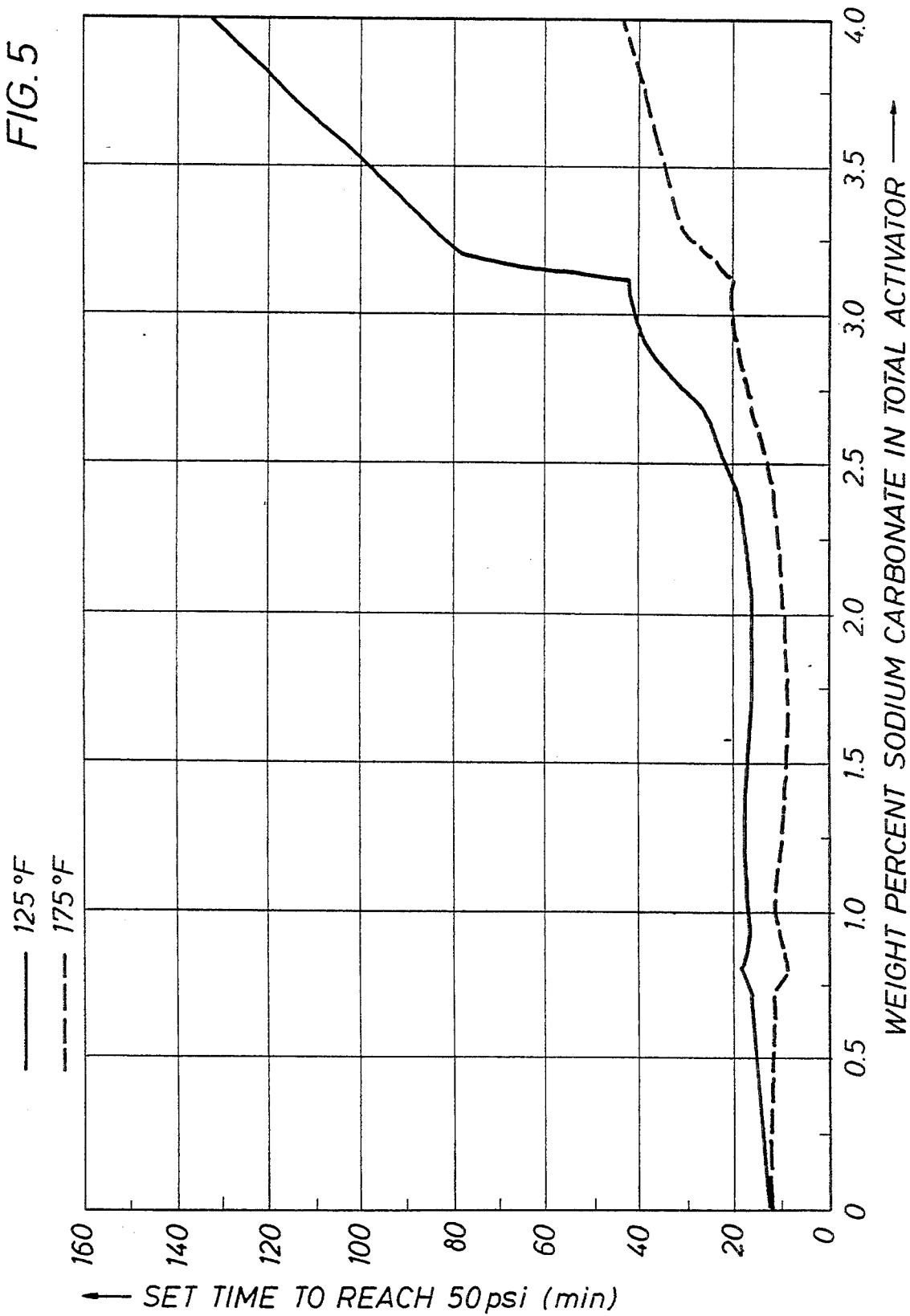
Figure 6:
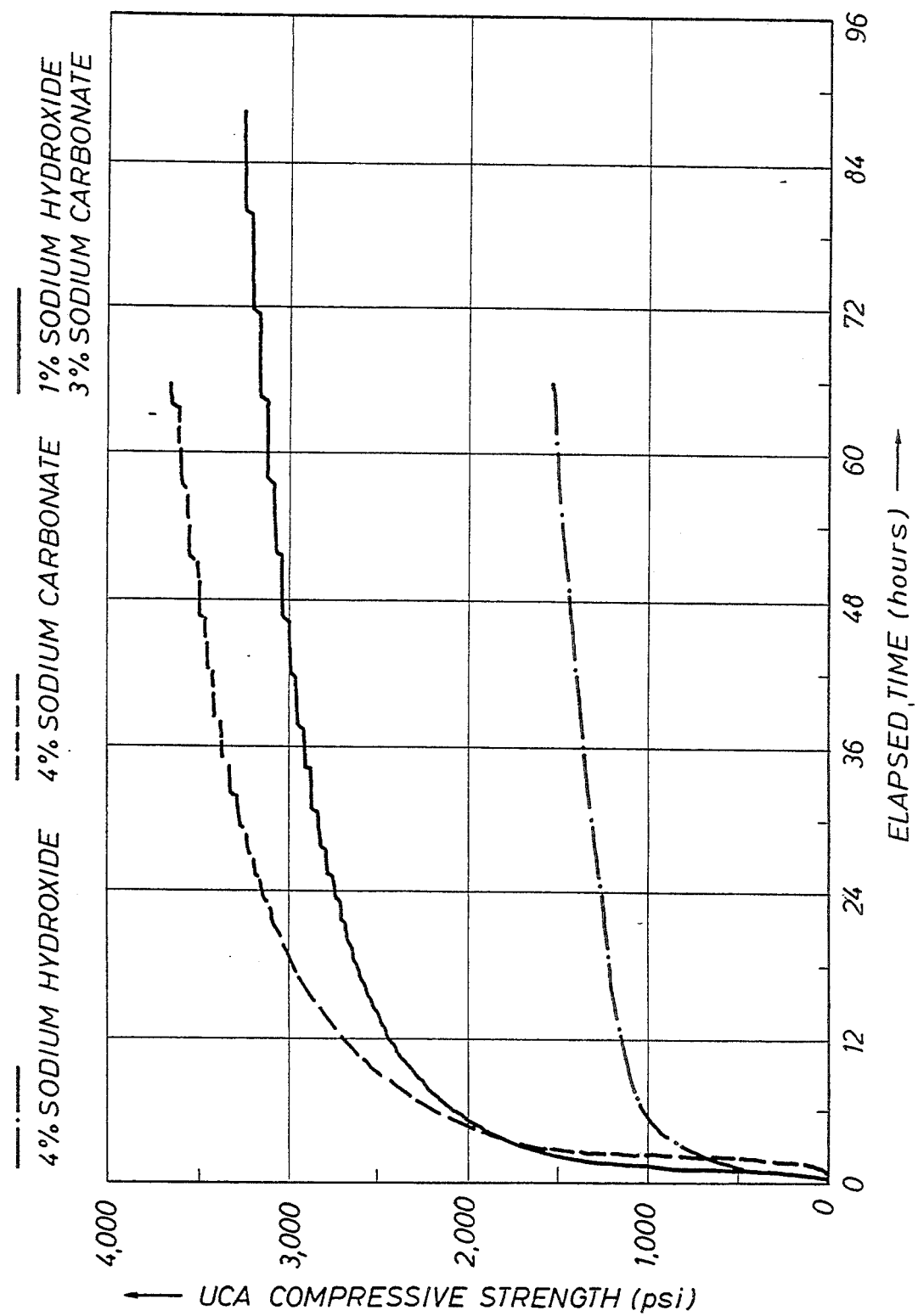
FIG. 6 shows data suggesting that sodium hydroxide has greater impact on set time of the formulation while sodium carbonate has greater impact on the compressive strength of the formulation.

FIGS. 3–6 and Tables 2 and 3 show the effects of the ratios of different components in the total activator on:
1) 24 hour compressive strength (FIG. 3)
2) early compressive strength development rate (FIG. 4)
3) set time (FIG. 5)

Each formulation contained 4% total activator. This total activator could be composed entirely of sodium hydroxide or entirely sodium carbonate or any weight ratio in between of these two components. The X-axis of these plots shows the amount of sodium carbonate present in the total activator. Hence, at 0 on the X-axis there is no sodium carbonate in the total activator; the total activator is 4% sodium hydroxide. At 4 on the X-axis only sodium carbonate is used as the total component of the activator; no sodium hydroxide is present in the total activator. At 2 on the X-axis, the total activator concentration of 4% (by weight of slag) is made up of 2% sodium hydroxide and 2% sodium carbonate.

Figure 3:
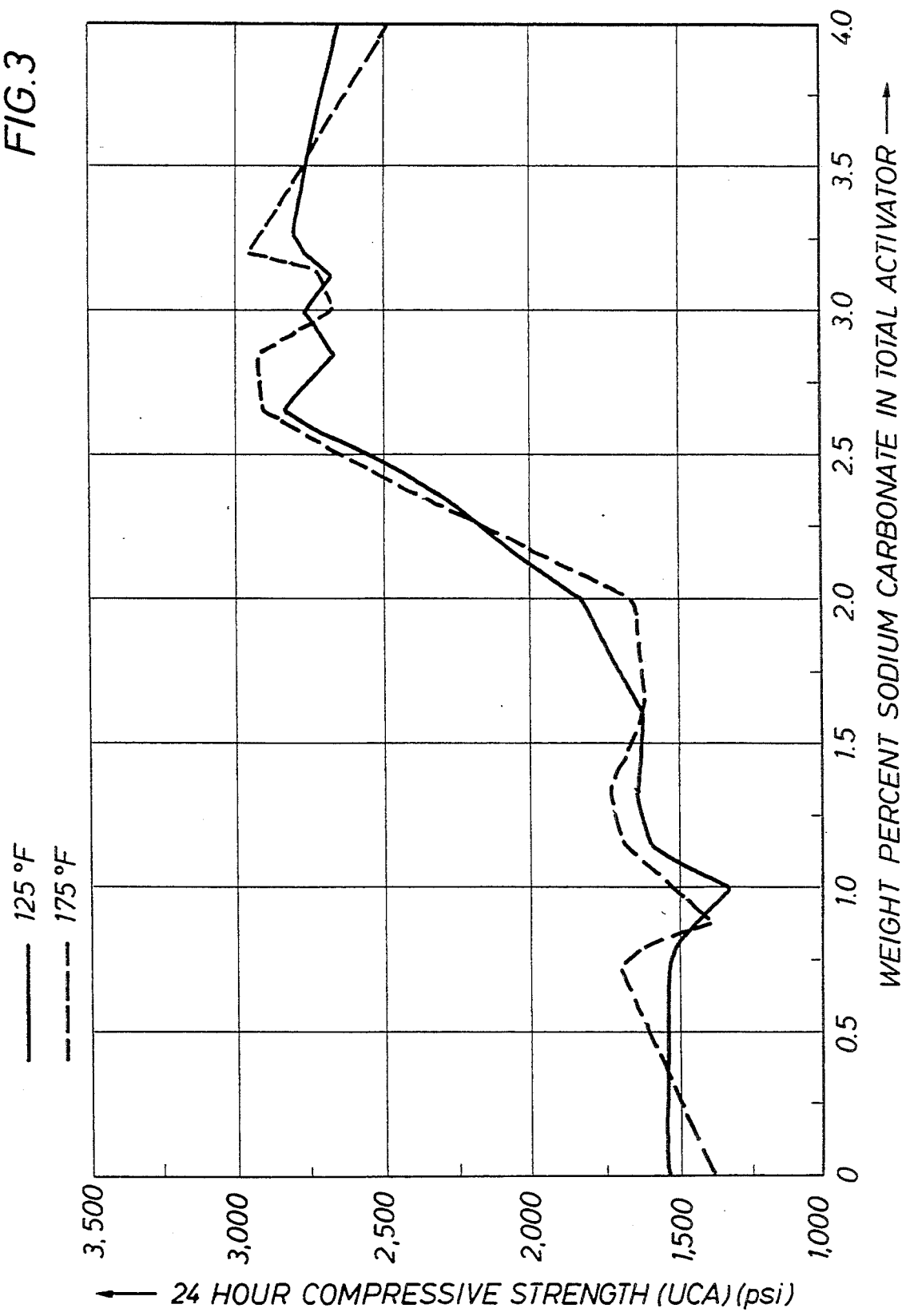
FIGS. 3–5 show the effects of the ratios of different components in the total activator on compressive strength, early compressive strength development rate and set time.
Figure 4:
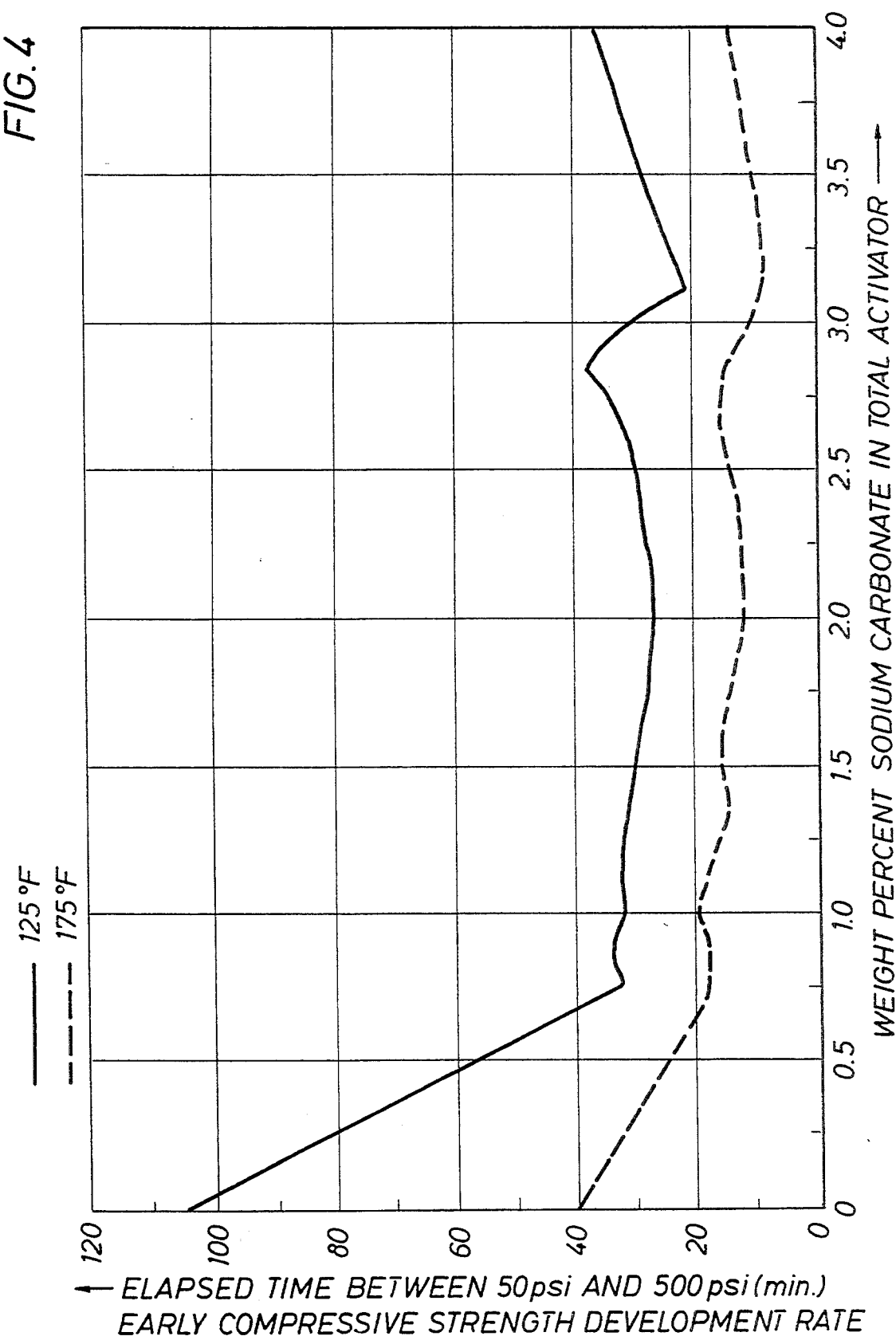

The data in FIG. 3 is based on the following: Base Formulation: "NEWCEM" ® blast furnace slag+50% distilled water (by wt of slag)+4% total activator (by wt of slag).

The data in FIG. 3 is based on the following: Base Formulation: "NEWCEM" ® blast furnace slag+50% distilled water (by wt of slag)+4% total activator (by wt of slag).

This data (FIG. 3) shows that higher compressive strengths are obtained (slag concentration is constant for all tests) when the sodium carbonate concentration is slightly in excess of the sodium hydroxide concentration in the total amount of activator.

A small amount of sodium carbonate (FIG. 4) in the total activator concentration is beneficial for improving the early compressive strength development rate.

A small amount of sodium hydroxide (FIG. 5) in the total activator concentration is beneficial for reducing the set time of the slag cement mixture.

This data suggests that sodium hydroxide has greater impact on the set time of the formulation while sodium carbonate has greater impact on the compressive strength of the formulation. This is more clear in FIG. 6.

TABLE 2

Effects of Ratios of Different Components in Total Activator on Compressive Strength Development Rate and Set Time

| Sodium Hydroxide % bwos* | Sodium Carbonate % bwos* | Weight Ratio of Sodium Hydroxide to Sodium Carbonate | Molar Ratio of Sodium Hydroxide to Sodium Carbonate | Elapsed Time in Minutes[1] to Reach 50 psi | Elapsed Time in Minutes[1] to Reach 500 psi | Elapsed Time in Minutes Between 50 psi and 500 psi[2] | Compressive Strength, psi, after indicated elapsed time 2 hrs | 4 hrs | 8 hrs | 12 hrs | 24 hrs |
|---|---|---|---|---|---|---|---|---|---|---|---|
| 4 | 0 | 4 to 0 |  | 13 | 118 | 105[5] | 516 | 907 | 1272 | 1379 | 1536 |
| 3.27 | 0.73 | 4.5 to 1 | 11.87 to 1 | 17 | 52 | 35 | 885 | 1068 | 1236 | 1339 | 1529 |
| 3.2 | 0.8 | 4 to 1 | 10.6 to 1 | 19 | 51 | 32 | 882 | 1038 | 1204 | 1306 | 1514 |
| 3.12 | 0.88 | 3.5 to 1 | 9.4 to 1 | 17 | 52 | 35 | 856 | 994 | 1136 | 1247 | 1445 |
| 3 | 1 | 3 to 1 | 7.95 to 1 | 17 | 48 | 32 | 823 | 919 | 1038 | 1126 | 1324 |
| 2.85 | 1.15 | 2.5 to 1 | 6.57 to 1 | 18 | 50 | 32 | 961 | 1128 | 1271 | 1376 | 1594 |
| 2.66 | 1.34 | 2 to 1 | 5.26 to 1 | 18 | 49 | 31 | 966 | 1148 | 1310 | 1419 | 1642 |
| 2.4 | 1.6 | 1.5 to 1 | 3.97 to 1 | 17 | 46 | 29 | 967 | 1136 | 1298 | 1407 | 1609 |
| 2 | 2 | 1 to 1 | 2.65 to 1 | 16 | 42 | 26 | 1082 | 1269 | 1469 | 1592 | 1820 |
| 2 | 2 | 1 to 1 |  | 15 | 36 | 21 | 997 | 1138 | 1315 | 1424 | 1626 |
| 1.6 | 2.4 | 0.67 to 1 | 1.77 to 1 | 20 | 49 | 29 | 1374[4] | 1657[4] | 1921[4] | 2084[4] | 2356[4] |
| 1.34 | 2.66 | 0.5 to 1 | 1.33 to 1 | 25 | 56 | 31 | 1645 | 2011 | 2366 | 2534 | 2830 |
| 1.15 | 2.85 | 0.4 to 1 | 1.07 to 1 | 37 | 75 | 38 | 1341 | 1792 | 2132 | 2344 | 2651 |
| 1 | 3 | .33 to 1 | 0.88 to 1 | 42 | 74 | 32 | 1466 | 1861 | 2216 | 2438 | 2758 |
| 0.88 | 3.12 | .28 to 1 | 0.75 to 1 | 43 | 64 | 21 | 1534 | 1870 | 2195 | 2381 | 2656 |
| 0.8 | 3.2 | .25 to 1 | 0.66 to 1 | 79[3] | 102 | 23 | 1121 | 1806 | 2180 | 2399 | 2752 |
| 0.73 | 3.27 | .22 to 1 | 0.59 to 1 | 83[3] | 107 | 24 | 995 | 1830 | 2241 | 2465 | 2797 |
| 0 | 4 | 0 to 4 | 0.00 | 134[3] | 170 | 36 | 33 | 1566 | 2011 | 2237 | 2631 |

*By weight of slag
Total Activator concentration was 4% by weight of slag for all tests.
Sample Formulation: "NEWCEM" Blast Furnace Slag + 50% fresh water (bwos) + 4% Total Activator (bwos)
Test Temperature: 125° F.
[1]This is set time.
[2]Early compressive strength development rate
[3]Sodium hydroxide in small quantity helped reduce this set time
[4]Higher strength when carbonate in excess of hydroxide
[5]Early compressive strength development rate increased due to carbonate

TABLE 3

Effects of Ratios of Different Components in Total Activator on Compressive Strength

| Sodium Hydroxide % bwos* | Sodium Carbonate % bwos* | Weight Ratio of Sodium Hydroxide to Sodium Carbonate | Molar Ratio of Sodium Hydroxide to Sodium Carbonate | Elapsed Time in Minutes[1] to Reach 50 psi | Elapsed Time in Minutes[1] to Reach 500 psi | Elapsed Time in Minutes Between 50 psi and 500 psi[2] | Compressive Strength, psi, after indicated elapsed time 2 hrs | 4 hrs | 8 hrs | 12 hrs | 24 hrs |
|---|---|---|---|---|---|---|---|---|---|---|---|
| 4 | 0 | 4 to 0 |  | 12 | 51 | 39 | 998 | 1097 | 1190 | 1255 | 1379 |
| 3.27 | 0.73 | 4.5 to 1 | 11.87 to 1 | 12 | 30 | 18 | 1027 | 1178 | 1348 | 1463 | 1699 |
| 3.2 | 0.8 | 4 to 1 | 10.6 to 1 | 9 | 27 | 18 | 991 | 1122 | 1287 | 1397 | 1623 |
| 3.12 | 0.88 | 3.5 to 1 | 9.4 to 1 | 10 | 28 | 18 | 846 | 955 | 1092 | 1200 | 1389 |
| 3 | 1 | 3 to 1 | 7.95 to 1 | 12 | 32 | 20 | 911 | 1027 | 1174 | 1288 | 1511 |
| 2.85 | 1.15 | 2.5 to 1 | 6.57 to 1 | 11 | 29 | 18 | 1049 | 1152 | 1317 | 1427 | 1676 |
| 2.66 | 1.34 | 2 to 1 | 5.26 to 1 | 10 | 25 | 15 | 1067 | 1173 | 1342 | 1454 | 1733 |
| 2.4 | 1.6 | 1.5 to 1 | 3.97 to 1 | 9 | 25 | 16 | 1042 | 1130 | 11275 | 1382 | 1603 |
| 2 | 2 | 1 to 1 | 2.65 to 1 | 10 | 22 | 12 | 1078 | 1182 | 1331 | 1422 | 1645 |
| 1.6 | 2.4 | 0.67 to 1 | 1.77 to 1 | 12 | 25 | 13 | 1657[4] | 1870[4] | 2055[4] | 2200[4] | 2455[4] |
| 1.34 | 2.66 | 0.5 to 1 | 1.33 to 1 | 16 | 32 | 16 | 1953 | 2237 | 2495 | 2637 | 2907 |
| 1.15 | 2.85 | 0.4 to 1 | 1.07 to 1 | 19 | 34 | 15 | 1993 | 2280 | 2543 | 2686 | 2920 |
| 1 | 3 | .33 to 1 | 0.88 to 1 | 21 | 32 | 11 | 1864 | 2131 | 2343 | 2441 | 2650 |
| 0.88 | 3.12 | .28 to 1 | 0.75 to 1 | 21 | 28 | 9 | 1937 | 2186 | 2405 | 2505 | 2683 |
| 0.8 | 3.2 | .25 to 1 | 0.66 to 1 | 26[3] | 35 | 9 | 2065 | 2399 | 2641 | 2792 | 2951 |
| 0.73 | 3.27 | .22 to 1 | 0.59 to 1 | 31[3] | 40 | 9 | 1980 | 2298 | 2565 | 2673 | 2907 |

TABLE 3-continued

Effects of Ratios of Different Components in Total Activator on Compressive Strength

| Sodium Hydroxide % bwos* | Sodium Carbonate % bwos* | Weight Ratio of Sodium Hydroxide to Sodium Carbonate | Molar Ratio of Sodium Hydroxide to Sodium Carbonate | Elapsed Time in Minutes[1] to Reach | | Elapsed Time in Minutes Between 50 psi and 500 psi[2] | Compressive Strength, psi, after indicated elapsed time | | | | |
|---|---|---|---|---|---|---|---|---|---|---|---|
| | | | | 50 psi | 500 psi | | 2 hrs | 4 hrs | 8 hrs | 12 hrs | 24 hrs |
| 0 | 4 | 0 to 4 | 0.00 | 44[3] | 58 | 14 | 1593 | 1888 | 2127 | 2274 | 2465 |

*By weight of slag
Total Activator concentration was 4% by weight of slag for all tests.
Sample Formulation: "NEWCEM" Blast Furnace Slag + 50% fresh water (bwos) + 4% Total Activator (bwos)
Test Temperature: 175° F.

Figure 7:
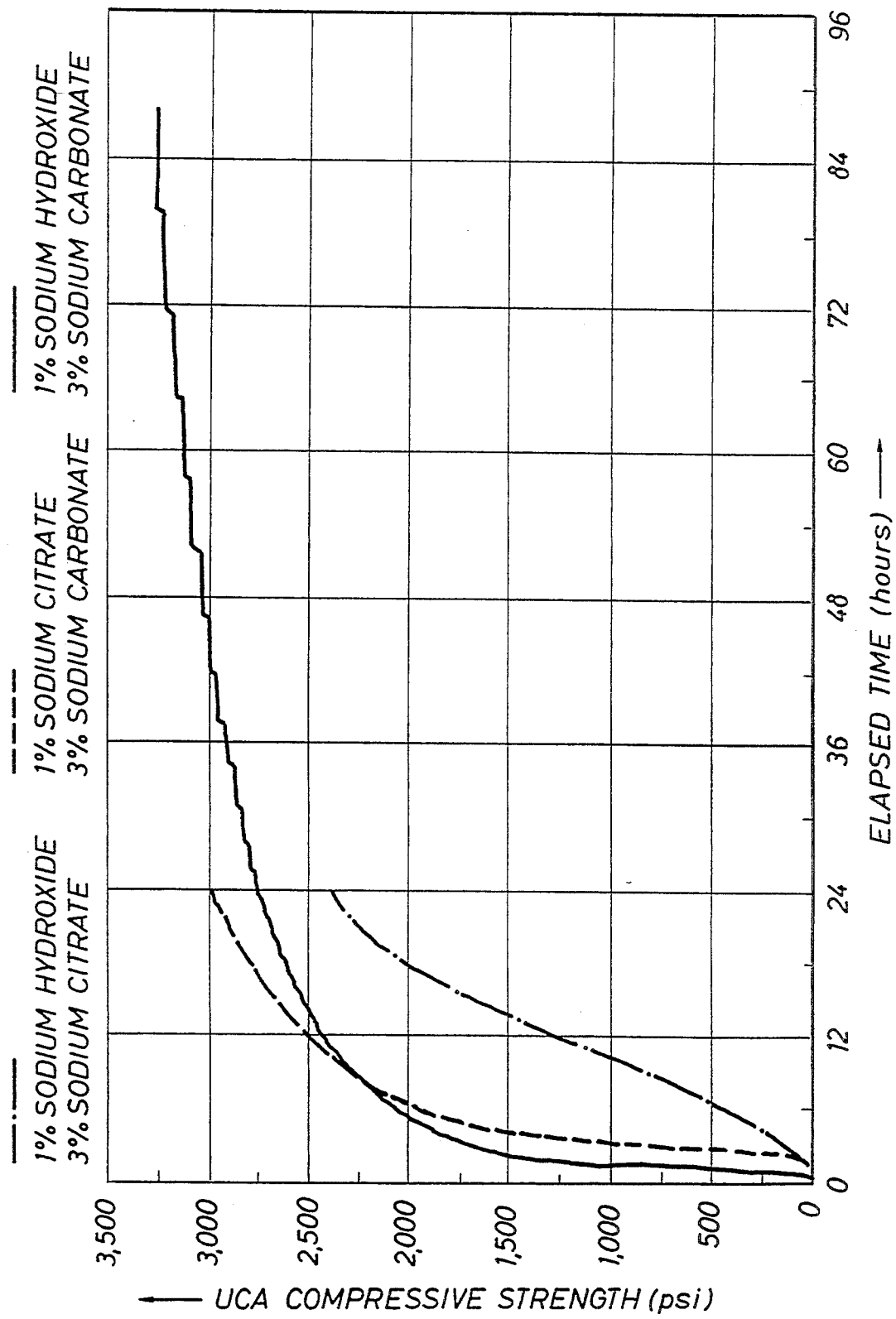
FIG. 7 shows ratios of components controlling set time, compressive strength and early compressive strength development rate.

FIG. 7 and Table 4 show sodium citrate as a viable replacement for sodium hydroxide. Combinations of sodium citrate, sodium carbonate and sodium hydroxide can be made with improved properties.

The data in FIG. 7 is based on the following: Base Formulation: "NEWCEM" ® blast furnace slag + 50% distilled water (by wt of slag) + 4% total activator (by wt of slag).

FIG. 7 shows ratios of components are still important to controlling set time, compressive strength and early compressive strength development rate.

Replacing sodium hydroxide with sodium citrate improved total compressive strength while maintaining a high early compressive strength development rate.

Table 4 shows incorporation of sodium hydroxide to change the set time and early compressive strength development rate.

TABLE 4

Incorporation of Sodium Hydroxide to Change Set Time and Early Compressive Strength Development Rate

| Time Hours | 1% Sodium Citrate 3% Sodium Carbonate | 0.5% Sodium Hydroxide 0.5% Sodium Citrate 3% Sodium Carbonate | 0.5% Sodium Hydroxide 1% Sodium Citrate 2.5% Sodium Carbonate | 1% Sodium Hydroxide 1% Sodium Citrate 2% Sodium Carbonate |
|---|---|---|---|---|
| 0 | 0 | 0 | 0 | 0 |
| 0.8 | 18 | 18 | 15 | 90[4] |
| 1.07 | 18 | 18 | 17 | 263[4] |
| 1.33 | 16 | 28 | 46[3] | 502[4] |
| 1.6 | 18 | 92[2] | 206[3] | 718 |
| 2.04 | 50[1] | 620[2] | 791 | 988 |
| 2.4 | 188[1] | 1116 | 1170 | 1172 |
| 3.2 | 934 | 1584 | 1621 | 1466 |
| 4 | 1468 | 1782 | 1849 | 1696 |
| 4.8 | 1762 | 1930 | 2003 | 1836 |
| 5.6 | 1933 | 2035 | 2113 | 1937 |
| 6.4 | 2038 | 2146 | 2199 | 2017 |
| 7.2 | 2149 | 2234 | 2290 | 2100 |
| 8 | 2207 | 2326 | 2353 | 2158 |
| 12 | 2526 | 2628 | 2660 | 2372 |
| 16 | 2704 | 2816 | 2811 | 2505 |
| 20 | 2857 | 2935 | 2970 | 2647 |
| 24 | 2978 | 3059 | 3054 | 2721 |

[1,2,3]Show fast early compressive strength development
[4]Shows slower early compressive strength development.

TABLE 5

Evaluation of Phosphates to Replace Sodium Hydroxide in Total Activator

| Time Hours | 1% Sodium Hydroxide 3% Sodium Carbonate[1] | 1% Calcium Phosphate 3% Sodium Carbonate[2] | 1% Trisodium Phosphate 3% Sodium Carbonate[3] | 1% Sodium Pyrophosphate 3% Sodium Carbonate[4] | 1% Sodium Tripolyphosphate 3% Sodium Carbonate[5] | 1% Sodium Hexametaphosphate 3% Sodium Carbonate[7] | 1% Tetrasodium Pyrrophosphate 3% Sodium Carbonate[8] |
|---|---|---|---|---|---|---|---|
| 0 | 0 | 0 | 0 | 0 | 0 | 0 | 0 |
| 0.5333333 | 13 | 22 | 20 | 22 | 18 | 11 | 18 |
| 1.066667 | 355 | 25 | 23 | 20 | 20 | 13 | 16 |
| 1.6 | 1207 | 25 | 23 | 22 | 20 | 15 | 16 |
| 2.133333 | 1488 | 60 | 25 | 22 | 18 | 17 | 16 |
| 2.666667 | 1633 | 440 | 0 | 22 | 16 | 17 | 15 |
| 3.2 | 1721 | 1024 | 0 | 22 | 18 | 19 | 16 |
| 3.733333 | 1815 | 1288 | 0 | 22 | 18 | 19 | 15 |
| 4.266667 | 1889 | 1409 | 25 | 22 | 18 | 21 | 15 |
| 4.8 | 1940 | 1502 | 531 | 22 | 18 | 21 | 15 |
| 6.4 | 2103 | 1644 | 1577 | 26 | 18 | 21 | 16 |
| 8 | 2219 | 1754 | 1906 | 26 | 20 | 23 | 16 |
| 9.6 | 2311 | 1848 | 2069 | 26 | 20 | 23 | 16 |
| 11.2 | 2408 | 1922 | 2216 | 30 | 20 | 25 | 16 |
| 12.8 | 2474 | 1999 | 2341 | 172 | 18 | 25 | 13 |
| 14.4 | 2508 | 2053 | 2407 | 786 | 16 | 23 | 11 |
| 16 | 2578 | 2107 | 2544 | 1373 | 34 | 21 | 58 |
| 17.6 | 2613 | 2136 | 2616 | 1626 | 155 | 31 | 359 |
| 19.2 | 2650 | 2194 | 2690 | 1806 | 506 | 103 | 968 |
| 20.8 | 2686 | 2222 | 2690 | 1955 | 931 | 393 | 1303 |
| 24 | 2761 | 2283 | 2805 | 2176 | 1563 | 1368 | 1714 |
| 32 | 2880 | | 3010 | | 2234 | 2418 | 2295 |
| 40 | 2960 | | 3141 | | [6]2593 | 2849 | 2593 |
| 48 | 3044 | | 3233 | | | | |
| 56 | 3088 | | 3325 | | | | |

TABLE 5-continued

| | Evaluation of Phosphates to Replace Sodium Hydroxide in Total Activator | | | | | | |
|---|---|---|---|---|---|---|---|
| Time Hours | 1% Sodium Hydroxide 3% Sodium Carbonate[1] | 1% Calcium Phosphate 3% Sodium Carbonate[2] | 1% Trisodium Phosphate 3% Sodium Carbonate[3] | 1% Sodium Pyrophosphate 3% Sodium Carbonate[4] | 1% Sodium Tripolyphosphate 3% Sodium Carbonate[5] | 1% Sodium Hexametaphosphate 3% Sodium Carbonate[7] | 1% Tetrasodium Pyrrophosphate 3% Sodium Carbonate[8] |
| 64 | 3131 | | 3374 | | | | |

[1] "Control"
[2] Lower compressive strength than "Control"
[3] Set time delayed. Slightly higher comp. strength than "Control".
[4] Set time delayed. Lower comp. strength than "Control" at 24 hrs
[5] Set time delayed. Lower comp. strength than "control" at 24 hrs
[6] Strength increasing, approaching "control"
[7] Set time delayed. Lower comp. strength than "control" at 24 hrs
[8] Set time delayed. Lower comp. strength than "control" at 24 hrs

TABLE 6

| | Evaluation of Phosphates to Replace Sodium Carbonate in Total Activator | | | | | | |
|---|---|---|---|---|---|---|---|
| Time Hours | 1% Sodium Hydroxide 3% Sodium Carbonate[1] | 1% Sodium Hydroxide 3% Calcium Phosphate[2] | 1% Sodium Hydroxide 3% Trisodium Phosphate[3] | 1% Sodium Hydroxide 3% Sodium Pyrophosphate[4] | 1% Sodium Hydroxide 3% Sodium Tripolyphosphate[5] | 1% Sodium Hydroxide 3% Sodium Hexametaphosphate[6] | 1% Sodium Hydroxide 3% Tetrasodium Pyrophosphate[7] |
| 1 | 0 | 0 | 0 | 0 | 0 | 0 | 0 |
| 0.5 | 13 | 40 | 9 | 19 | 13 | 14 | 17 |
| 1.07 | 355 | 208 | 11 | 21 | 19 | 12 | 111 |
| 1.6 | 1207 | 330 | 16 | 42 | 24 | 17 | 467 |
| 2.13 | 1488 | 407 | 17 | 323 | 30 | 26 | 681 |
| 2.67 | 1633 | 463 | 67 | 551 | 38 | 33 | 866 |
| 3.2 | 1721 | 499 | 113 | 751 | 42 | 37 | 1020 |
| 3.73 | 1815 | 538 | 452 | 943 | 46 | 41 | 1143 |
| 4.27 | 1889 | 566 | 921 | 1097 | 49 | 43 | 1202 |
| 4.8 | 1940 | 587 | 1331 | 1199 | 51 | 45 | 1265 |
| 6.4 | 2103 | 617 | 1899 | 1344 | 263 | 51 | 1382 |
| 8 | 2219 | 673 | 2128 | 1451 | 1450 | 53 | 1473 |
| 9.6 | 2311 | 716 | 2297 | 1527 | 1934 | 55 | 1530 |
| 11.2 | 2408 | 742 | 2419 | 1608 | 2180 | 59 | 1590 |
| 12.8 | 2474 | 780 | 2516 | 1650 | 2362 | 64 | 1653 |
| 14.4 | 2508 | 809 | 2616 | 1715 | 2493 | 117 | 1696 |
| 16 | 2578 | 829 | 2721 | 1760 | 2632 | 574 | 1741 |
| 17.6 | 2613 | 849 | 2794 | 1806 | 2705 | 1303 | 1763 |
| 19.2 | 2650 | 870 | 2869 | 1830 | 2820 | 1823 | 1809 |
| 20.8 | 2686 | 892 | 2832 | 1878 | 2858 | 2079 | 1833 |
| 24 | 2761 | 925 | 2947 | 1928 | 3021 | 2375 | 1906 |
| 32 | 2880 | | 3152 | 2059 | 3239 | 2792 | 2008 |
| 40 | 2960 | | 3239 | 2170 | 3378 | [8]3076 | 2116 |
| 48 | 3044 | | 3375 | 2258 | 3526 | | 2173 |
| 56 | 3088 | | 3420 | 2319 | 3626 | | |
| 64 | 3131 | | 3467 | 2382 | 3733 | | |

[1] "Control"
[2] Lower comp. strength than "control"
[3] Higher comp. strength than control, but longer set time.
[4] Lower comp. strength than control
[5],[6],[7] Larger set time, higher comp. strength
[8] Higher strength than control @ 40 hrs

TABLE 7

| | Combination of Phosphate (Sodium Tripolyphosphate), Sodium Carbonate and Sodium Hydroxide to Vary Set Time and Strength (Total and Early Compressive Strength Development Rate | | | | | |
|---|---|---|---|---|---|---|
| Time Hours | 0.5% Sodium Tripolyphosphate 0.5% Sodium Hydroxide 3% Sodium Carbonate | 1% Sodium Tripolyphosphate 1% Sodium Hydroxide 2% Sodium Carbonate | 3% Sodium Tripolyphosphate 1% Sodium Hydroxide | 1% Sodium Tripolyphosphate 3% Sodium Carbonate | 1% Sodium Hydroxide 3% Sodium Carbonate | |
| 0 | 0 | 0 | 0 | 0 | 0 | |
| 0.53 | 18 | 16 | 13 | 18 | 13 | |
| 1.07 | 19 | 20 | 19 | 20 | 355 | |
| 1.6 | 19 | 22 | 24 | 20 | 1207 | |
| 2.13 | 19 | 24 | 30 | 18 | 1488 | |
| 2.67 | 21 | 24 | 38 | 16 | 1633 | |
| 3.2 | 21 | 26 | 42 | 18 | 1721 | |
| 3.73 | 21 | 26 | 46 | 18 | 1815 | |
| 4.27 | 21 | 28 | 49 | 18 | 1889 | |
| 4.8 | 21 | 28 | 51 | 18 | 1940 | |
| 6.4 | 23 | 30 | 263 | 18 | 2103 | |
| 8 | 23 | 65 | 1450 | 20 | 2219 | |
| 9.6 | 23 | 884 | 1934 | 20 | 2311 | |
| 11.2 | 23 | 1465 | 2180 | 20 | 2408 | |

TABLE 7-continued

Combination of Phosphate (Sodium Tripolyphosphate),
Sodium Carbonate and Sodium Hydroxide to Vary Set Time and Strength
(Total and Early Compressive Strength Development Rate

| Time Hours | 0.5% Sodium Tripolyphosphate 0.5% Sodium Hydroxide 3% Sodium Carbonate | 1% Sodium Tripolyphosphate 1% Sodium Hydroxide 2% Sodium Carbonate | 3% Sodium Tripolyphosphate 1% Sodium Hydroxide | 1% Sodium Tripolyphosphate 3% Sodium Carbonate | 1% Sodium Hydroxide 3% Sodium Carbonate |
|---|---|---|---|---|---|
| 12.8 | 61 | 1830 | 2362 | 18 | 2474 |
| 14.4 | 352 | 2035 | 2493 | 16 | 2508 |
| 16 | 875 | 2204 | 2632 | 34 | 2578 |
| 24 | 1984 | 2701 | 3021 | 1563 | 2761 |

TABLE 8

Effect of Cation of Sulfate Salts on Set Time and Compressive Strength of Blast Furnace Slag Cement Compressive Strength, psi, of Formulations Containing the Indicated Activators

| Elapsed Time Hours | 1% Sodium Hydroxide 3% Sodium Carbonate | 1% Sodium Hydroxide 3% Sodium Sulfate | 1% Sodium Hydroxide 3% Magnesium Sulfate | 1% Sodium Hydroxide 3% Calcium Sulfate | 1% Sodium Hydroxide 3% Ferrous Sulfate | 1% Sodium Hydroxide 3% Ferric Sulfate | 1% Sodium Hydroxide 3% Cobalt Sulfate | 1% Sodium Hydroxide 3% Nickel Sulfate | 1% Sodium Hydroxide 3% Cupric Sulfate | 1% Sodium Hydroxide 3% Zinc Sulfate | 1% Sodium Hydroxide 3% Aluminum Sulfate | 1% Sodium Hydroxide 3% Ammonium Sulfate |
|---|---|---|---|---|---|---|---|---|---|---|---|---|
| 0 | 0 | 0 | 0 | 0 | 0 | 0 | 0 | 0 | 0 | 0 | 0 | 0 |
| 1.07 | 281 | 150 | 20 | 34 | 13 | 13 | 30 | 121 | 12 | 19 | 17 | 13 |
| 2.13 | 1505 | 374 | 28 | 109 | 193 | 11 | 332 | 473 | 10 | 17 | 16 | 13 |
| 4.09 | 1886 | 576 | 275 | 457 | | | | | | | | |
| 8 | 2216 | 703 | 948 | 1002 | 742 | 419 | 696 | 899 | 10 | 17 | 19 | 95 |
| 12.1 | 2438 | 770 | 1294 | 1053 | | | | | | | | |
| 16 | 2575 | 821 | 1506 | 1093 | 968 | 1510 | 872 | 1100 | 9 | 13 | 17 | 1141 |
| 17.6 | 2610 | 843 | 1564 | 1093 | 980 | 1589 | 894 | 1129 | 9 | 11 | 17 | 1261 |
| 19.2 | 2647 | 854 | 1604 | 1106 | 1018 | 1695 | 928 | 1157 | 9 | 11 | 17 | 1342 |
| 20.8 | 2683 | 876 | 1667 | 1120 | 1044 | 1762 | 952 | 1187 | 8 | 11 | 17 | 1430 |
| 22.4 | 2721 | 888 | 1710 | 1134 | 1071 | 1832 | 976 | 1217 | 8 | 14 | 17 | 1504 |
| 24 | 2758 | 899 | 1744 | 1134 | 1084 | 1880 | 964 | 1202 | 8 | 20 | 17 | 1562 |
| 25.6 | | 911 | 1800 | | 1098 | 1930 | 1001 | 1233 | 8 | 29 | 17 | 1602 |
| 27.2 | | 935 | 1823 | | 1127 | 1981 | 1026 | 1249 | 8 | 40 | 17 | 1665 |
| 28.8 | | 947 | 1871 | | 1141 | 2034 | 1039 | 1265 | 8 | 54 | 17 | 1708 |
| 30.4 | | 959 | 1895 | | 1155 | 2061 | 1052 | 1265 | 8 | 67 | 17 | 1730 |
| 32 | | 959 | 1920 | | 1170 | 2088 | 1066 | 1280 | 8 | 82 | 17 | 1775 |
| 33.6 | | 972 | 1945 | | 1185 | 2144 | 1079 | 1297 | 8 | 99 | 17 | 1821 |
| 35.2 | | 984 | 1971 | | 1200 | 2172 | 1092 | 1313 | 8 | 114 | 17 | 1845 |
| 36.8 | | 997 | 1996 | | 1215 | 2202 | 1106 | 1330 | 8 | 129 | 17 | 1869 |
| 38.4 | | 1010 | 2022 | | 1231 | 2202 | 1106 | 1347 | 8 | 141 | 17 | 1893 |
| 40 | | 1010 | 2022 | | 1247 | 2230 | 1120 | 1347 | 8 | 152 | 17 | 1918 |
| 41.6 | | 1023 | 2049 | | 1247 | 2260 | 1135 | 1364 | 8 | 163 | 17 | 1943 |
| 43.2 | | | | | 1263 | 2291 | 1149 | 1364 | 8 | 171 | 17 | 1969 |
| 44.8 | | | | | 1278 | 2291 | 1149 | 1382 | 8 | 177 | 17 | 1994 |
| 46.4 | | | | | 1278 | 2321 | 1163 | 1382 | 9 | 186 | 17 | 1994 |
| 48 | | | | | 1295 | 2352 | 1178 | 1400 | 10 | 189 | 17 | 2020 |
| 56 | | | | | 1345 | 2416 | 1208 | 1435 | 323 | 207 | 17 | 2101 |
| 64 | | | | | 1380 | 2482 | 1255 | 1473 | 1084 | 217 | 17 | 2157 |
| 72 | | | | | | | 1286 | 1511 | 1541 | | 29 | |
| 80 | | | | | | | 1319 | 1530 | 1820 | | 16 | |
| 88 | | | | | | | 1353 | 1570 | 1993 | | 16 | |

Base Formulation: NEWCEM Blast Furnace Slag mixed with 50% Distilled Water (by weight of the slag) plus indicated activator mixtures
Test Temperature: 125 F. (52 C.)
Curing Pressure: 3000 psi
Calcium Sulfate = $CaSO_4.2H_2O$
Ferrous Sulfate = $FeSO_4.7H_2O$
Ferric Sulfate = $Fe_2(SO_4)_3.H_2O$
Cobalt Sulfate = $CoSO_4.7H_2O$
Nickel Sulfate = $NiSO_4.6H_2O$
Zinc Sulfate = $ZnSO_4.7H_2O$
Aluminum Sulfate = $Al_2(SO_4)_3.16H_2O$

TABLE 9

Set Time and Compressive Strength Data
Comparisons of Activator:Retarder Ratio with Different Retarder Types and Strengths

| Additives and Concentration | Total Activator % bwos | Test Duration hours | Set time hours | Equation for Line Between 50 psi and 500 psi Slope | Intercept | Compressive Strength 14 hours after Set Time | Final Strength psi |
|---|---|---|---|---|---|---|---|
| None | 0 | 18 | 2.72 | 78.44 | −128.72 | 723 | 740 |
| None | 1 | 18 | 1.68 | 507.51 | −844.57 | 1039 | 1068 |
| None | 2 | 18 | 1.4 | 741.96 | −1046.07 | 1611 | 1677 |
| None | 4 | 18 | 0.6 | 1024.55 | −647.00 | 2836 | 2966 |
| None | 6 | 18 | 0.5 | 794.33 | −417.14 | 3824 | 3924 |
| 0.1% "REAX" 100M | 0 | 18 | 3.78 | 113.04 | −470.89 | 867 | 869 |
| 0.1% "REAX" 100M | 1 | 18 | 1.93 | 574.26 | −1109.86 | 1153 | 1163 |
| 0.1% "REAX" 100M | 2 | 18 | 1.48 | 877.10 | −1311.57 | 1707 | 1778 |
| 0.1% "REAX" 100M | 4 | 18 | 0.65 | 1316.57 | −931.80 | 2941 | 3083 |
| 0.1% "REAX" 100M[1] | 6 | 18 [3]60:1 | 0.52 | 976.47 | −519.82 | 3498 | 3548 |
| 0.2% "REAX" 100M | 0 | 22.5 | 6.15 | 130.57 | −768.22 | 996 | 1060 |
| 0.33% "REAX" 100M | 0 | 18 | 14.63 | 135.26 | −1971.55 | 795 | 568 |
| 0.33% "REAX" 100M | 1 | 18 | 2.97 | 527.32 | −1561.04 | 1278 | 1294 |
| 0.33% "REAX" 100M | 2 | 18 | 2.12 | 732.72 | −1558.23 | 1655 | 1714 |
| 0.33% "REAX" 100M | 4 | 18 [3]12.1:1 | 0.75 | 1652.63 | −1304.50 | 3032 | 3113 |
| 0.33% "REAX" 100M | 6 | 18 [3]18.2:1 | 0.6 | 1455.75 | −768.60 | 3504 | 3554 |
| 0.1% "SEQLENE 540" | 0 | 66 | 34.2 | 78.68 | −1674.31 | 939 | 1365 |
| 0.1% "SEQLENE 540" | 1 | 66 | 5.78 | 434.89 | −2502.49 | 1248 | 1644 |
| 0.1% "SEQLENE 540" | 2 | 66 | 3.62 | 862.37 | −3138.26 | 1849 | 2482 |
| 0.1% "SEQLENE 540" | 4 | 66 | 1.4 | 1680.75 | −2407.00 | 3166 | 3990 |
| 0.1% "SEQLENE 540"[2] | 6 | 68 [3]60:1 | 0.77 | 1708.88 | −1369.30 | 3670 | 4522 |
| 0.1% Sodium Gluconate | 0 | 90 | 57.72 | 55.19 | −3173.07 | 808 | 1478 |
| 0.1% Sodium Gluconate | 1 | 90 | 6.88 | 460.20 | −3172.23 | 1435 | 2008 |
| 0.1% Sodium Gluconate | 2 | 90 | 3.77 | 792.32 | −3018.93 | 1873 | 2655 |
| 0.1% Sodium Gluconate | 4 | 90 | 1.95 | 1239.75 | −2429.60 | 2993 | 3936 |
| 0.1% Sodium Gluconate | 6 | 90 [3]60:1 | 1.23 | 1618.88 | −2000.70 | 3607 | 4565 |
| 0.33% Sodium Gluconate | 0 | 43 | — | — | — | — | — |
| 0.33% Sodium Gluconate | 1 | 43 | 24.5 | 147.93 | −3633.58 | 2540 | 2805 |
| 0.33% Sodium Gluconate | 2 | 43 | 17.23 | 197.88 | −3398.37 | 2919 | 3483 |
| 0.33% Sodium Gluconate | 4 | 43 [3]12.1 | 8.9 | 344.25 | −3079.35 | 3858 | 4547 |
| 0.33% Sodium Gluconate | 6 | 43 [3]18.2 | 6.05 | 633.48 | −3844.71 | 4050 | 4710 |
| 0.33% Sodium Gluconate | 8 | 43 [3]24.2 | 3.73 | 1468.02 | −5457.53 | 3412 | 4148 |

Figure 8:
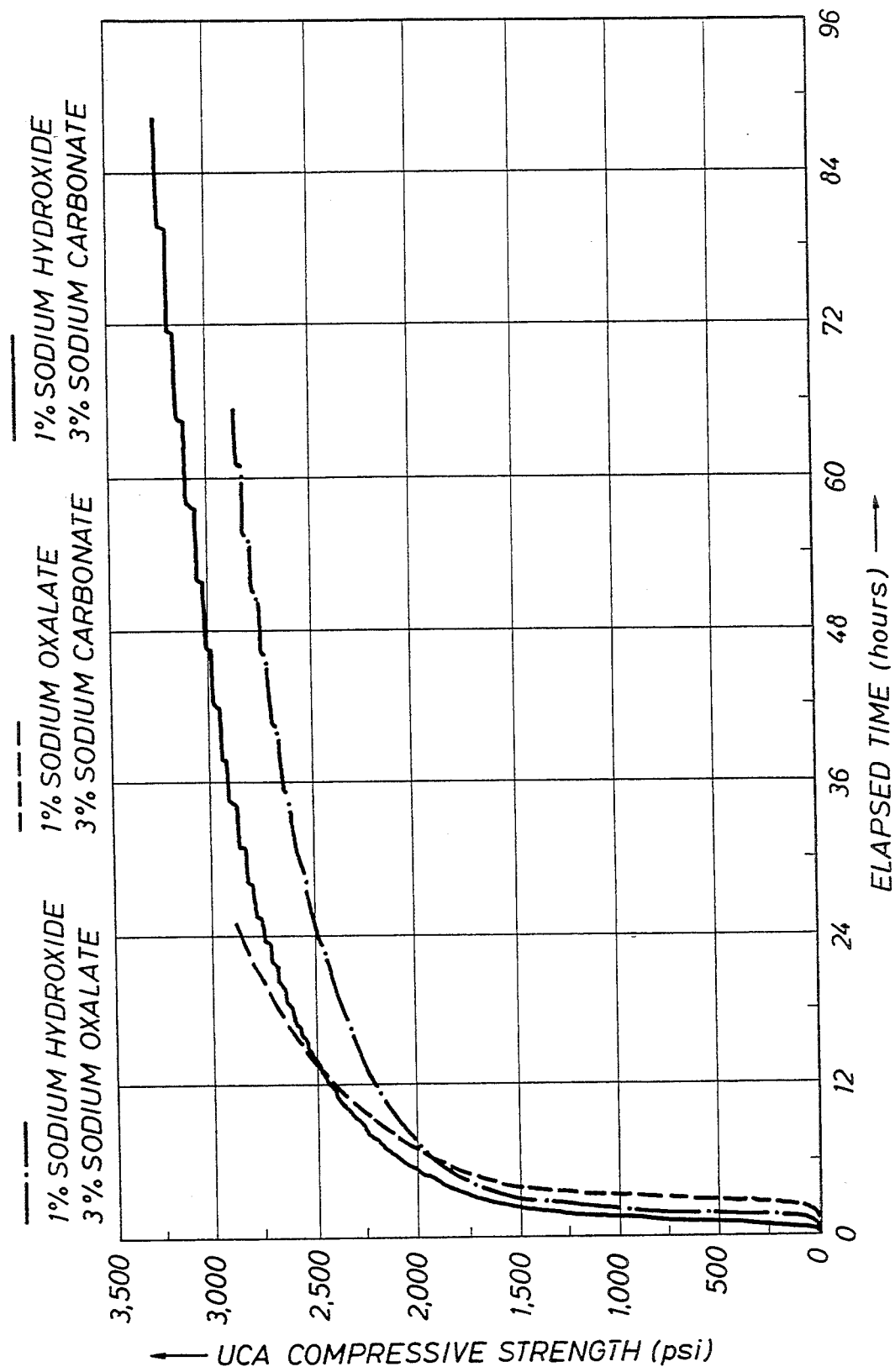
FIG. 8 shows similarity of benefits from sodium oxalate and sodium citrate.

[1]"REAX" is sulfonated Kraft lignin
[2]"SEQLENE 540" is sodium glucohepatonate
[3]Activator:Retarder ratio FIG. 8 shows sodium oxalate as giving similar benefits as sodium citrate.

Figure 9:
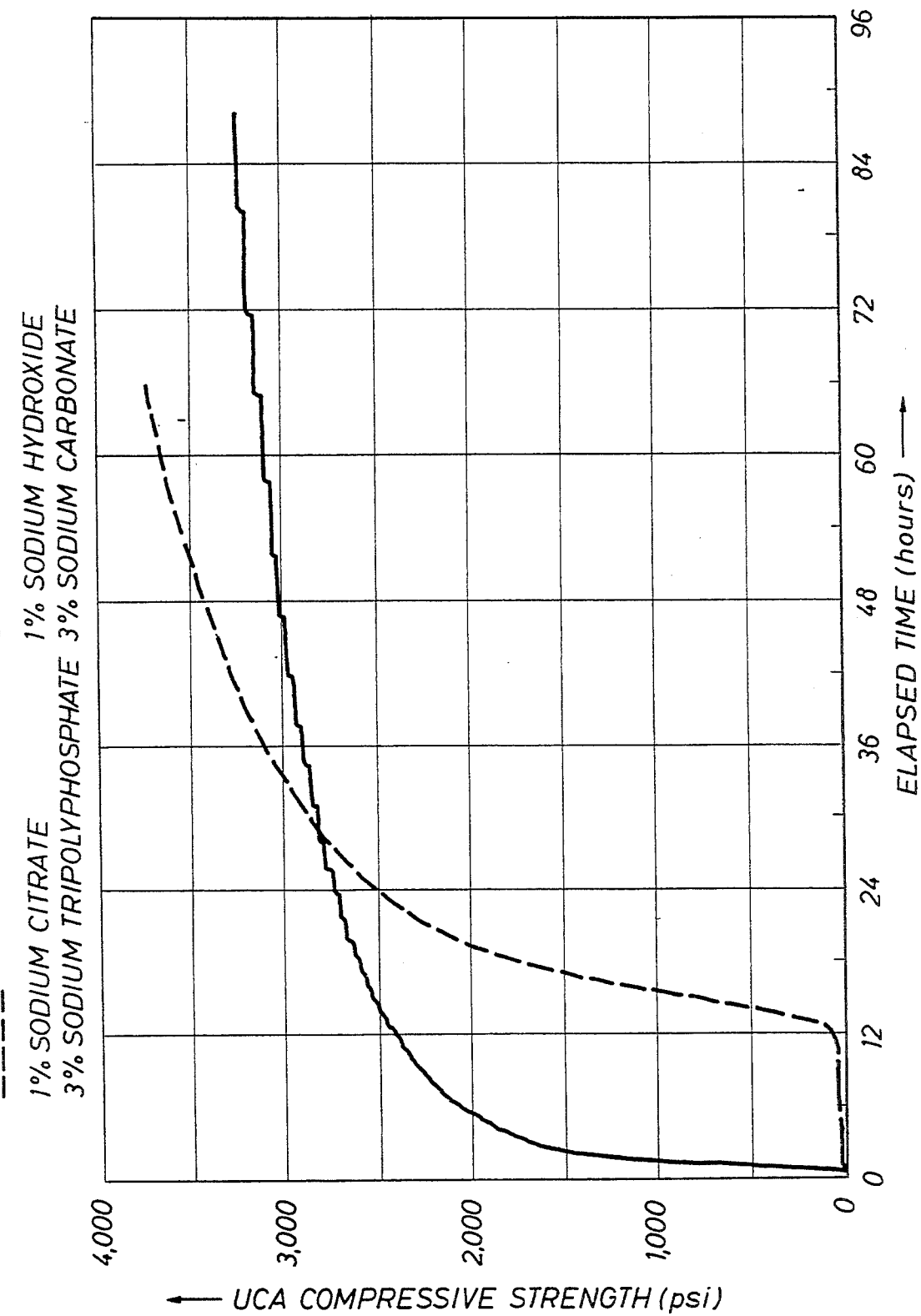
FIGS. 9–10 are comparisons of the combination of citrate with phosphate and citrate, phosphate and sodium hydroxide.
Figure 10:
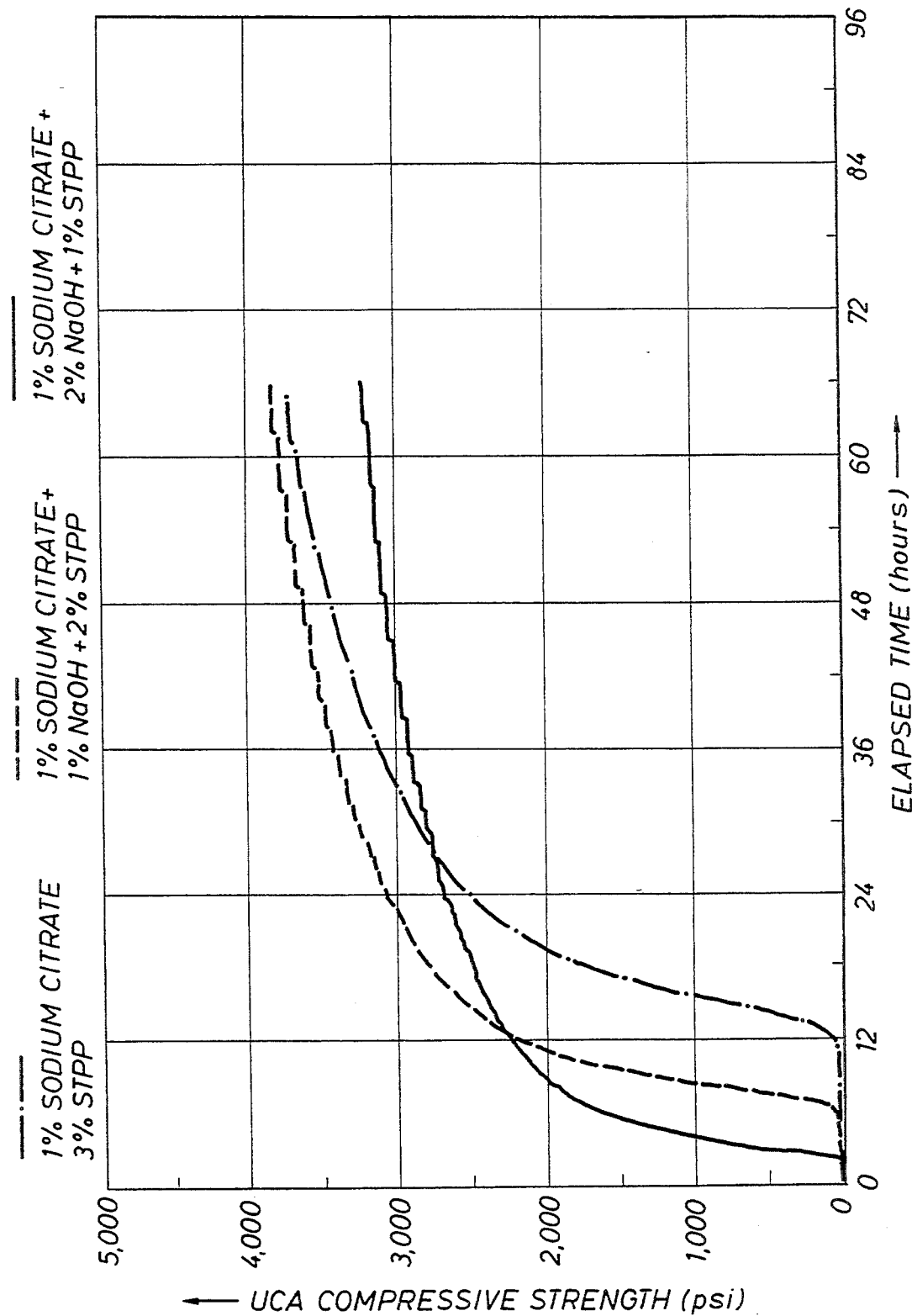

FIGS. 9 and 10 show comparison of the combination of citrate with phosphate and citrate, phosphate and sodium hydroxide. (Sodium hydroxide can reduce set time.)

Figure 11:
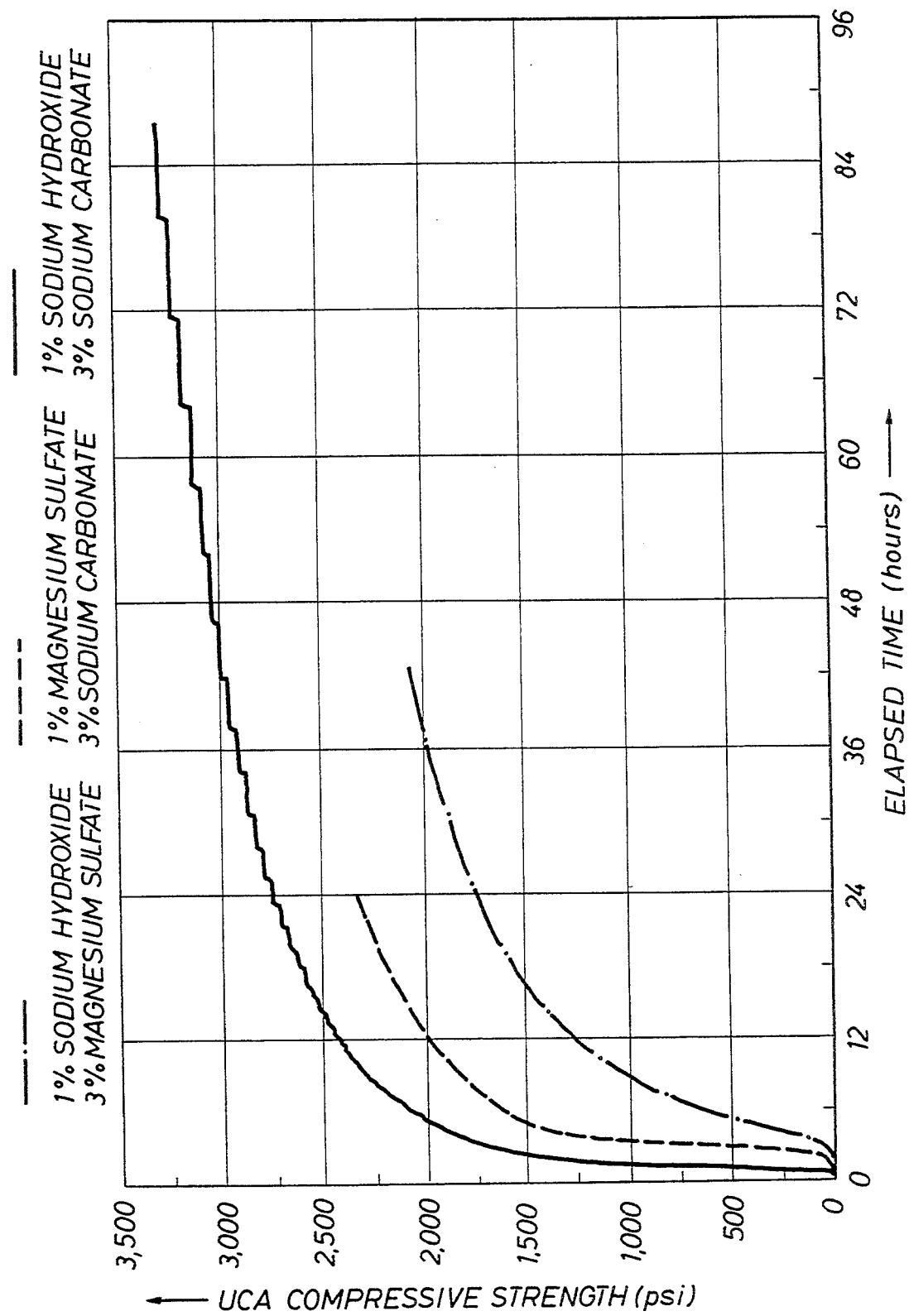
FIGS. 11–12 show the effect of component ratios when other activators were used.
Figure 12:
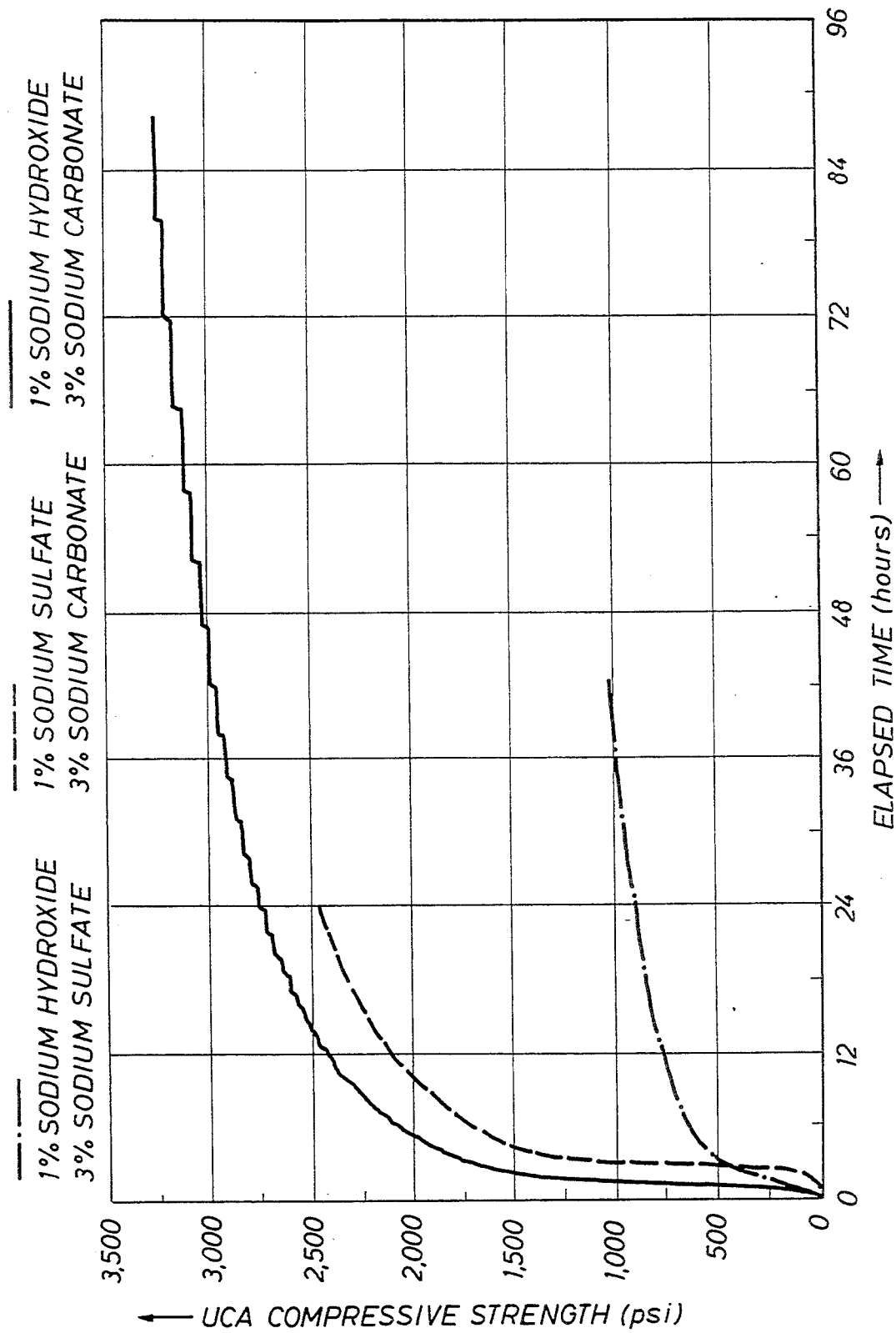

Other activators were tried and the effect of component ratios is clearly distinguishable in FIGS. 11 and 12.

Tables 9 through 12 show that ratio for set time, early compressive strength development rate and final strength varies with retarder strength, temperature and activator strength.

TABLE 10

Base Slurry: "NEWCEM" Blast Furnace Slag + 0.1% Sodium Gluconate (bwos*) + 50% Distilled Water (bwos)
Test Temperature: 125° F.

| | No Activator | 0.10% Activator | 0.20% Activator | 0.40% Activator | 0.80% Activator | 1% Activator | 1.20% Activator | 1.40% Activator | 1.60% Activator | 1.80% Activator |
|---|---|---|---|---|---|---|---|---|---|---|
| Time to 50 psi | | | | 33.93 | 18.1 | 16 | 12 | 11.55 | 9.72 | 737 |
| Time to 500 psi | | | | 43.97 | 20.63 | 17.9 | 13.55 | 12.93 | 10.9 | 8.43 |
| Time from 50 psi to 500 psi | | | | 10.04 | 2.53 | 1.9 | 1.55 | 1.38 | 1.18 | 1.06 |
| Activator:Retarder Ratio | | | | 4:1 | 8:1 | 10:1 | 12:1 | 14:1 | 16:1 | 18:1 |

| | 2% Activator | 2.20% Activator | 2.40% Activator | 2.60% Activator | 2.80% Activator | 3% Activator | 4% Activator | 5% Activator | 6% Activator | 7% Activator |
|---|---|---|---|---|---|---|---|---|---|---|
| Time to 50 psi | 6.08 | 5.38 | 5.27 | 5.2 | 5.17 | 4.43 | 3.1 | 0.93 | 1.78 | 1.15 |
| Time to 500 psi | 6.82 | 6.03 | 5.97 | 5.87 | 5.8 | 5 | 3.58 | 1.28 | 2.1 | 1.4 |
| Time from 50 psi to 500 psi | 0.74 | 0.65 | 0.7 | 0.67 | 0.63 | 0.57 | 0.48 | 0.35 | 0.32 | 0.25 |
| Activator:Retarder Ratio | 20:1 | 22:1 | 24:1 | 26:1 | 28:1 | 30:1 | 40:1 | 50:1 | 60:1 | 70:1 |

*bwos = by weight of slag

TABLE 11

Base Slurry: "NEWCEM" Blast Furnace Slag + 0.1% Sodium Gluconate (bwos*) + 50% Distilled Water (bwos)
Test Temperature: 150° F.

|  | No Activator | 0.10% Activator | 0.20% Activator | 0.40% Activator | 0.80% Activator | 1% Activator | 1.20% Activator | 1.40% Activator | 1.60% Activator | 1.80% Activator |
|---|---|---|---|---|---|---|---|---|---|---|
| Time to 50 psi | 43.15 | 22.52 | 15.7 | 9.68 | 4.98 | 4.53 | 4.2 | 4 | 2.95 | 2.27 |
| Time to 500 psi | 53.37 | 28.9 | 20.35 | 12.62 | 6 | 5.58 | 5.28 | 4.83 | 3.57 | 2.63 |
| Time from 50 psi to 500 psi | 10.22 | 6.38 | 4.65 | 2.94 | 1.02 | 1.05 | 1.08 | 0.83 | 0.62 | 0.36 |
| Activator:Retarder Ratio | 0 | 1:1 | 2:1 | 4:1 | 8:1 | 10:1 | 12:1 | 14:1 | 16:1 | 18:1 |

|  | 2% Activator | 2.20% Activator | 2.40% Activator | 2.60% Activator | 2.80% Activator | 3% Activator | 4% Activator | 5% Activator | 6% Activator | 7% Activator |
|---|---|---|---|---|---|---|---|---|---|---|
| Time to 50 psi | 2.23 | 2 | 2.1 | 1.82 | 1.43 | 1.5 | 1.2 | 1.02 | 1 | 0.97 |
| Time to 500 psi | 2.68 | 2.38 | 2.45 | 2.2 | 1.62 | 1.75 | 1.45 | 1.15 | 1.15 | 1.12 |
| Time from 50 psi to 500 psi | 0.45 | 0.38 | 0.35 | 0.38 | 0.19 | 0.25 | 0.25 | 0.13 | 0.15 | 0.15 |
| Activator:Retarder Ratio | 20:1 | 22:1 | 24:1 | 26:1 | 28:1 | 30:1 | 40:1 | 50:1 | 60:1 | 70:1 |

*bwos = by weight of slag

TABLE 12

Base Slurry: "NEWCEM" Blast Furnace Slag + 0.1% Sodium Gluconate (bwos*) + 50% Distilled Water (bwos)
Test Temperature: 175° F.

|  | No Activator | 0.10% Activator | 0.20% Activator | 0.40% Activator | 0.80% Activator | 1% Activator | 1.20% Activator | 1.40% Activator | 1.60% Activator | 1.80% Activator |
|---|---|---|---|---|---|---|---|---|---|---|
| Time to 50 psi | 17.95 | 10.3 | 7.37 | 4.17 | 2.58 | 2.1 | 1.87 | 1.38 | 1.48 | 1.4 |
| Time to 500 psi | 22.27 | 15.12 | 9.57 | 5.68 | 3.45 | 2.72 | 2.38 | 1.68 | 1.78 | 1.73 |
| Time from 50 psi to 500 psi | 4.32 | 4.82 | 2.2 | 1.51 | 0.87 | 0.62 | 0.51 | 0.3 | 0.3 | 0.33 |
| Activator:Retarder Ratio | 0 | 1:1 | 2:1 | 4:1 | 8:1 | 10:1 | 12:1 | 14:1 | 16:1 | 18:1 |

|  | 2% Activator | 2.20% Activator | 2.40% Activator | 2.60% Activator | 2.80% Activator | 3% Activator | 4% Activator | 5% Activator | 6% Activator | 7% Activator |
|---|---|---|---|---|---|---|---|---|---|---|
| Time to 50 psi | 1.05 | 1.17 | 1.03 | 1.15 | 1.22 | 0.73 | 0.6 | 0.62 | 0.62 | 0.72 |
| Time to 500 psi | 1.22 | 1.37 | 1.27 | 1.33 | 1.4 | 0.83 | 0.73 | 0.75 | 0.7 | 0.83 |
| Time from 50 psi to 500 psi | 0.17 | 0.2 | 0.24 | 0.18 | 0.18 | 0.1 | 0.13 | 0.13 | 0.08 | 0.11 |
| Activator:Retarder Ratio | 20:1 | 22:1 | 24:1 | 26:1 | 28:1 | 30:1 | 40:1 | 50:1 | 60:1 | 70:1 |

*bwos = by weight of slag

What is claimed is:

1. A method for cementing a well, comprising:
   combining constituents comprising water, blast furnace slag having a particle size within the range of 2,000 to 15,000 cm²/g, and an activator comprising sodium pyrophosphate to form a cement slurry; displacing the cement slurry into the well; and allowing the cement slurry to set.

2. The method of claim 1 wherein the activator includes an oxalate ion-containing compound.

3. The method of claim 1 wherein the activator includes a citrate ion-containing compound.

4. The method of claim 3 wherein the citrate ion-containing compound is selected from the group consisting of sodium citrate, calcium citrate and potassium citrate.

5. The method of claim 1 wherein the weight ratio of activator to slag is adjusted to achieve optimum compressive strength of the cement.

6. The method of claim 5 wherein the weight ratio of activator to slag is further adjusted in accordance with well temperature to achieve optimum compressive strength of the cement.

7. The method of claim 3 wherein the ratio of activator components is adjusted to provide at least one of the following: (a) optimum set time of the cement slurry, (b) optimum compressive strength of the cement, (c) optimum early compressive strength development rate of the cement slurry, and (d) optimum rheological properties for the cement slurry.

8. The method of claim 3 wherein the weight ratio of activator to slag is adjusted to achieve optimum compressive strength of the cement.

9. The method of claim 8 wherein the weight ratio of activator to slag is further adjusted in accordance with well temperature to achieve optimum compressive strength of the cement.

10. The method of claim 5 wherein the activator includes multiple components and wherein the ratio of activator components is adjusted to provide at least one of the following: (a) optimum set time of the cement slurry, (b) optimum compressive strength of the cement, (c) optimum early compressive strength development rate of the cement slurry, and (d) optimum rheological properties for the cement slurry.

11. The method of claim 6 the activator includes multiple components and wherein the ratio of activator components is adjusted to provide at least one of the following: (a) optimum set time of the cement slurry, (b) optimum compressive strength of the cement, (c) optimum early compressive strength development rate of the cement slurry, and (d) optimum rheological properties for the cement slurry.

12. The method of claim 1 including adding a retarder to provide adequate fluidity time of the cement slurry in order to place the cement in the well.

13. The method of claim 12 wherein the retarder is a salt of a transition metal with an atomic number above iron in the periodic chart.

14. The method of claim 13 wherein the retarder is a copper, zinc or aluminum salt.

15. The method of claim 12 wherein the retarder is a complexing agent.

16. The method of claim 15 wherein the retarder is a lignosulfonate, sulfonated lignin, or lignin amine.

17. The method of claim 15 wherein the retarder is sodium glucoheptonate, sodium gluconate or sodium citrate.

18. The method of claim 12 wherein a ratio of weight of activator to weight of retarder is selected to provide the greatest early compressive strength development and the greatest final strength for a given slag concentration.

19. The method of claim 18 wherein the activator/retarder weight ratio is selected at the static temperature of the well to provide substantially the greatest early compressive strength development and substantially the greatest final strength for a given slag concentration.

20. The method of claim 18 wherein the activator/retarder ratio is selected for a set time of less than about ten hours.

21. The method of claim 18 wherein the activator/retarder ratio is selected for a set time of less than about eight hours.

22. The method of claim 18 wherein the activator/retarder ratio is selected for a set time of between three and six hours.

23. The method of claim 3 including adding a retarder to provide adequate fluidity time of the cement slurry in order to place the cement in the well.

24. The method of claim 23 wherein the retarder is a salt of a transition metal with an atomic number above iron in the periodic chart.

25. The method of claim 24 wherein the retarder is a copper, zinc or aluminum salt.

26. The method of claim 23 wherein the retarder is a complexing agent.

27. The method of claim 26 wherein the retarder is a lignosulfonate, sulfonated lignin, or lignin amine.

28. The method of claim 26 wherein the retarder is sodium glucoheptonate, sodium gluconate or sodium citrate.

29. The method of claim 23 wherein a ratio of weight of activator to weight of retarder is selected to provide the greatest early compressive strength development and the greatest final strength for a given slag concentration.

30. The method of claim 29 wherein the activator/retarder weight ratio is selected at the static temperature of the well to provide substantially the greatest early compressive strength development and substantially the greatest final strength for a given slag concentration.

31. The method of claim 29 wherein the activator/retarder ratio is selected for a set time of less than about ten hours.

32. The method of claim 29 wherein the activator/retarder ratio is selected for a set time of less than about eight hours.

33. The method of claim 29 wherein the activator/retarder ratio is selected for a set time of between three and six hours.

34. The method of claim 1 including adding a drilling fluid to the cement slurry.

35. The method of claim 5 including adding a retarder to provide adequate fluidity time of the cement slurry in order to place the cement in the well.

36. The method of claim 35 wherein the retarder is a salt of a transition metal with an atomic number above iron in the periodic chart.

37. The method of claim 36 wherein the retarder is a copper, zinc or aluminum salt.

38. The method of claim 35 wherein the retarder is a complexing agent.

39. The method of claim 38 wherein the retarder is a lignosulfonate, sulfonated lignin, or lignin amine.

40. The method of claim 38 wherein the retarder is sodium glucoheptonate, sodium gluconate or sodium citrate.

41. The method of claim 35 wherein a ratio of weight of activator to weight of retarder is selected to provide the greatest early compressive strength development and the greatest final strength for a given slag concentration.

42. The method of claim 41 wherein the activator/retarder weight ratio is selected at the static temperature of the well to provide substantially the greatest early compressive strength development and substantially the greatest final strength for a given slag concentration.

43. The method of claim 41 wherein the activator/retarder ratio is selected for a set time of less than about ten hours.

44. The method of claim 41 wherein the activator/retarder ratio is selected for a set time of less than about eight hours.

45. The method of claim 41 wherein the activator/retarder ratio is selected for a set time of between three and six hours.

46. The method of claim 41 including adding a drilling fluid to the slurry.

47. The method of claim 7 including adding a retarder to provide adequate fluidity time of the cement slurry in order to place the cement in the well.

48. The method of claim 47 wherein the retarder is a salt of a transition metal with an atomic number above iron in the periodic chart.

49. The method of claim 48 wherein the retarder is a copper, zinc or aluminum salt.

50. The method of claim 47 wherein the retarder is a complexing agent.

51. The method of claim 50 wherein the retarder is a lignosulfonate, sulfonated lignin, or lignin amine.

52. The method of claim 51 wherein the retarder is sodium glucoheptonate, sodium gluconate or sodium citrate.

53. The method of claim 47 wherein a ratio of weight of activator to weight of retarder is selected to provide the greatest early compressive strength development and the greatest final strength for a given slag concentration.

54. The method of claim 53 wherein the activator/retarder weight ratio is selected at the static temperature of the well to provide substantially the greatest early compressive strength development and substantially the greatest final strength for a given slag concentration.

55. The method of claim 53 wherein the activator/retarder ratio is selected for a set time of less than about ten hours.

56. The method of claim 53 wherein the activator/retarder ratio is selected for a set time of less than about eight hours.

57. The method of claim 53 wherein the activator/retarder ratio is selected for a set time of between three and six hours.

58. The method of claim 53 including adding a drilling fluid to the slurry.

59. The method of claim 1 including selecting an activator which also functions as a good dispersing agent, whereby dispersion will favor better compressive strength development after setting of the cement slurry.

60. The method of claim 1 including adding a sulfide scavenging compound to the cement slurry, said scavenging compound being selected from the group consisting of zinc oxide and zinc carbonate.

* * * * *